(12) United States Patent
McCaughey et al.

(10) Patent No.: US 10,090,875 B2
(45) Date of Patent: *Oct. 2, 2018

(54) PROTECTIVE COVER FOR A WIRELESS DEVICE

(71) Applicant: Penumbra Brands, Inc., North Salt Lake, UT (US)

(72) Inventors: Ryan Gerard McCaughey, Leesburg, VA (US); Kevin Wolentarski, Encinitas, CA (US); Nikhil Nilakantan, Leesburg, VA (US); Karl Richard Shields, Leesburg, VA (US)

(73) Assignee: Penumbra Brands, LLC, North Salt Lake, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,742

(22) Filed: Nov. 9, 2017

(65) Prior Publication Data

US 2018/0069582 A1    Mar. 8, 2018

Related U.S. Application Data

(63) Continuation of application No. 14/071,197, filed on Nov. 4, 2013, now Pat. No. 9,838,060, which is a
(Continued)

(51) Int. Cl.
*H04B 1/38* (2015.01)
*H04B 1/3827* (2015.01)
(Continued)

(52) U.S. Cl.
CPC .......... *H04B 1/3838* (2013.01); *H01Q 1/243* (2013.01); *H01Q 1/245* (2013.01); *H01Q 7/00* (2013.01); *H01Q 19/005* (2013.01); *H01Q 19/28* (2013.01); *H04B 1/3888* (2013.01); *H04M 1/0202* (2013.01); *H04M 1/0283* (2013.01); *H04M 1/185* (2013.01)

(58) Field of Classification Search
CPC ........ H01Q 1/243; H01Q 1/245; H01Q 19/00; H04M 1/0202; H04B 1/3827
USPC ........... 343/702, 872, 873; 455/575.1, 575.5, 455/575.7, 90.3
See application file for complete search history.

(56) References Cited

U.S. PATENT DOCUMENTS

| | | | | |
|---|---|---|---|---|
| 3,778,835 A | * | 12/1973 | Scharf .................... | G05D 1/104 342/386 |
| 8,957,813 B2 | * | 2/2015 | McCaughey .......... | H01Q 1/243 343/702 |
| 9,172,134 B2 | * | 10/2015 | McCaughey .......... | H01Q 1/243 |

* cited by examiner

*Primary Examiner* — Lam T Mai
(74) *Attorney, Agent, or Firm* — Holland & Hart LLP

(57) ABSTRACT

In some embodiments, an apparatus includes a protective cover configured to attach to a wireless device having an exterior surface. The surface includes a first portion and a second portion mutually exclusive from the first portion. The second portion of the surface is associated with at least a portion of an antenna of the wireless device that performs proximity sensing for the wireless device. The protective cover is configured to cover the first portion of the surface when the protective cover is attached to the wireless device. The protective cover is configured to not cover the second portion of the surface when the protective cover is attached to the wireless device. As a result, the proximity sensing and/or the power transmitted by the antenna are not affected by the protective cover when the protective cover is attached to the wireless device and when the wireless device is operational.

20 Claims, 18 Drawing Sheets

Related U.S. Application Data continuation-in-part of application No. 13/659,595, filed on Oct. 24, 2012, now Pat. No. 9,172,134, which is a continuation-in-part of application No. 13/287,680, filed on Nov. 2, 2011, now Pat. No. 8,957,813.

(51) Int. Cl.
*H04M 1/02* (2006.01)
*H01Q 1/24* (2006.01)
*H01Q 7/00* (2006.01)
*H01Q 19/00* (2006.01)
*H01Q 19/28* (2006.01)
*H04B 1/3888* (2015.01)
*H04M 1/18* (2006.01)

Loop 24mm x 16mm, 2mm in width located above antenna.

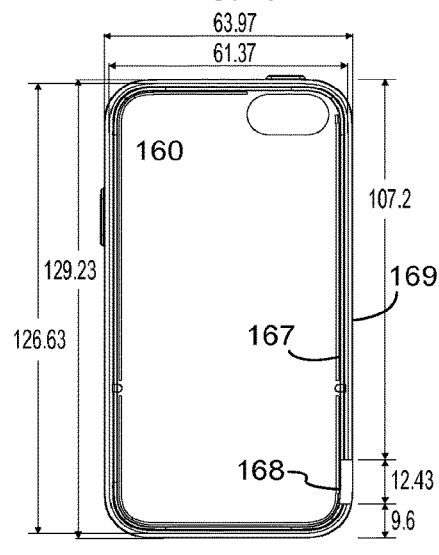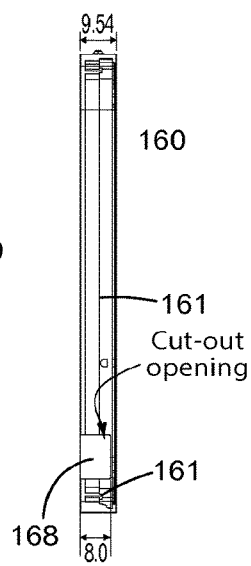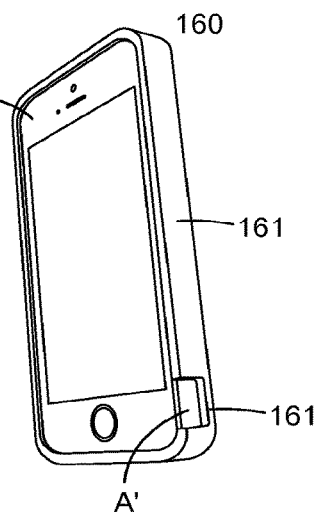
FIG. 16  FIG. 17  FIG. 18
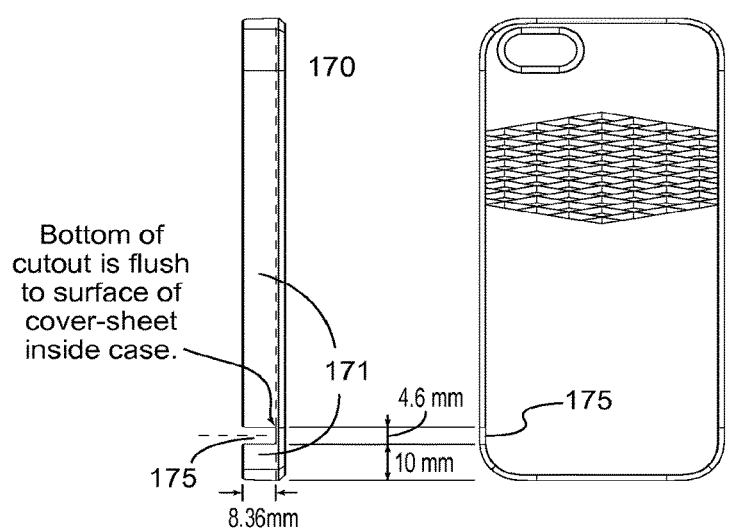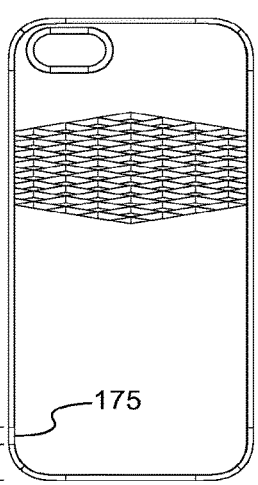
FIG. 19  FIG. 20  FIG. 21

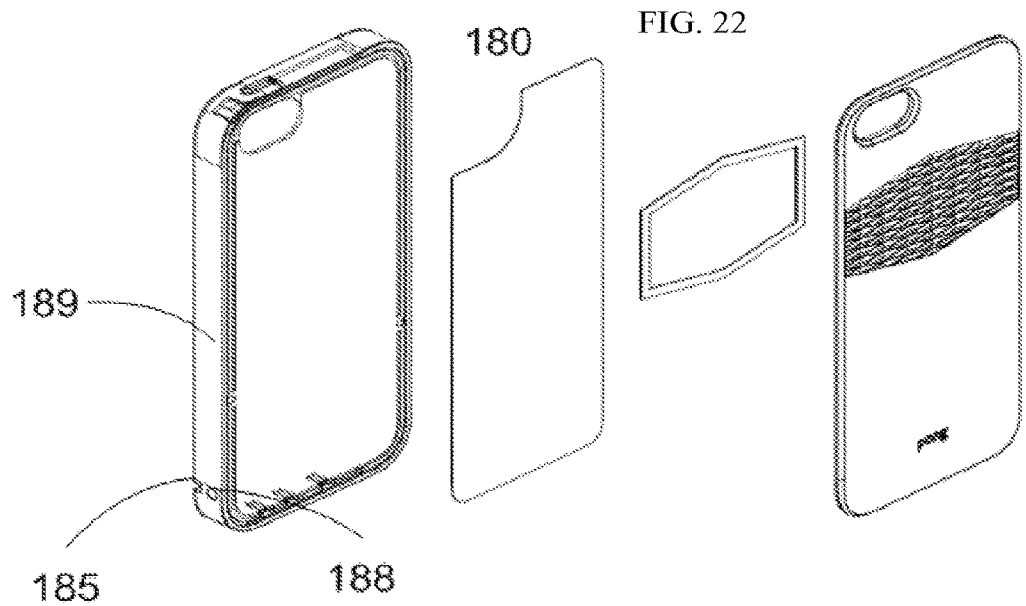
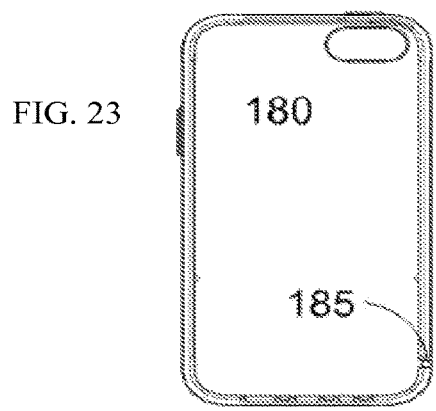
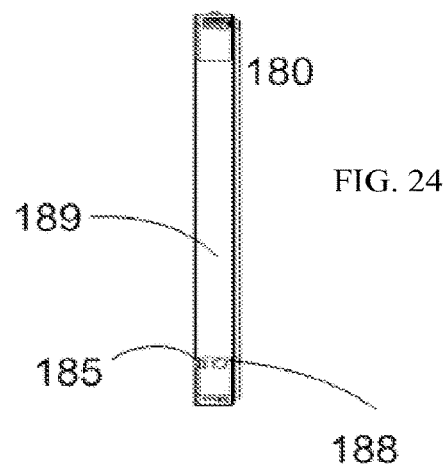
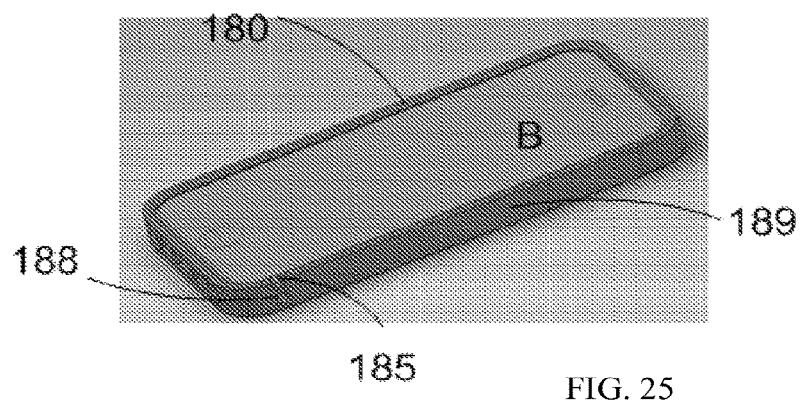

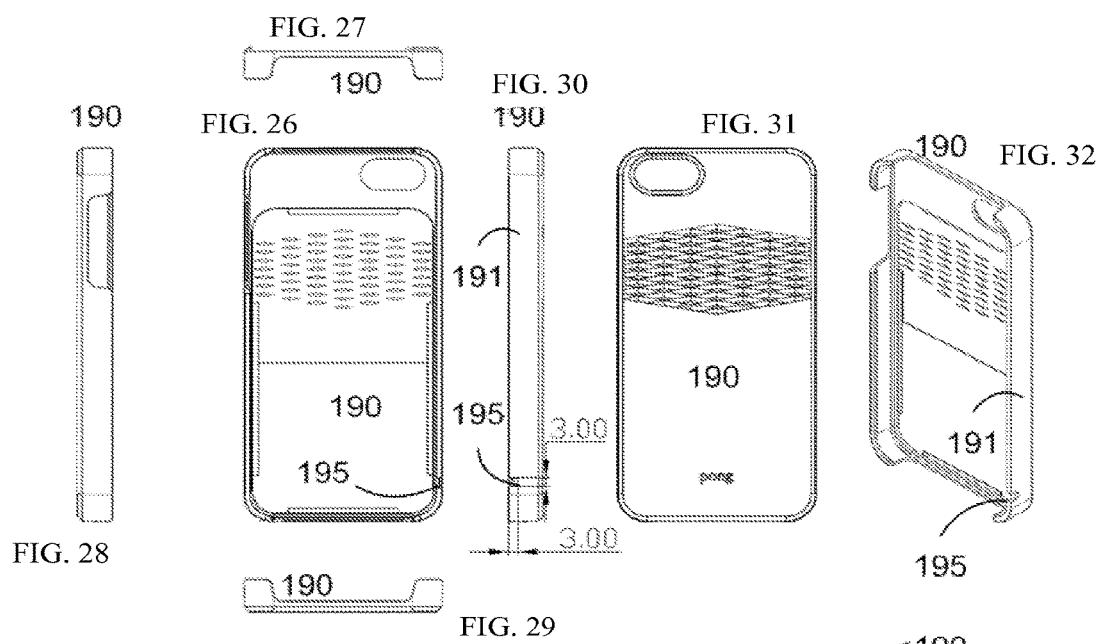
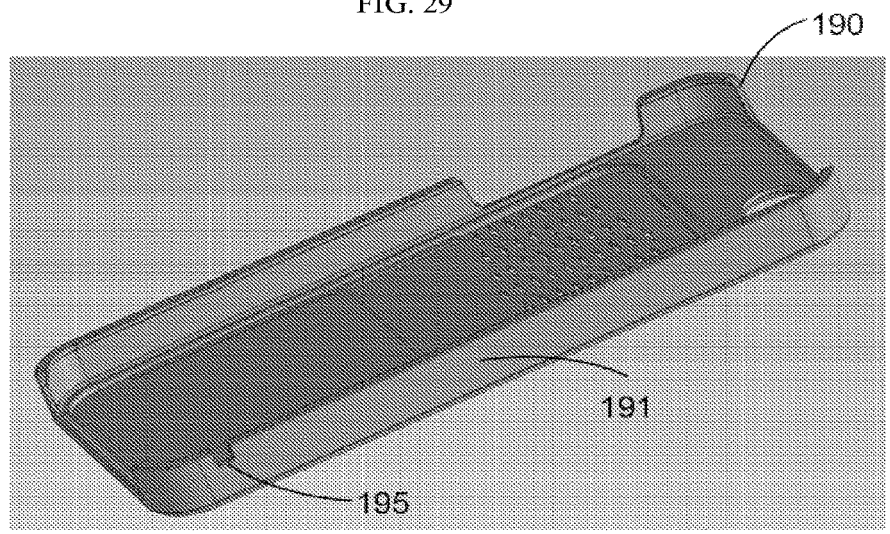

PROTECTIVE COVER FOR A WIRELESS DEVICE

CROSS REFERENCE TO RELATED APPLICATIONS AND CLAIM FOR PRIORITY

This application is a continuation of U.S. patent application Ser. No. 14/071,197 filed on Nov. 4, 2013, which is a continuation-in-part of U.S. patent application Ser. No. 13/659,595 filed on Oct. 24, 2012, now U.S. Pat. No. 9,172,134, which is a continuation-in-part of U.S. patent application Ser. No. 13/287,680, filed on Nov. 2, 2011, now U.S. Pat. No. 8,957,813; all of which are incorporated herein by reference in their entirety.

This application is related to U.S. patent application Ser. No. 12/724,290 filed Mar. 15, 2010, which claims priority to and the benefit of Provisional Application No. 61/160,282, filed Mar. 13, 2009, and is also a continuation-in-part of U.S. patent application Ser. No. 12/614,132, filed Nov. 6, 2009, which claims priority to and the benefit of U.S. Provisional Application No. 61/112,141, filed Nov. 6, 2008 and U.S. Provisional Application No. 61/158,551, filed Mar. 9, 2009; all of which are incorporated herein by reference in their entirety.

BACKGROUND

Some embodiments discussed herein relate generally to wireless devices such as cell phones, smart phones, and similar handheld devices such as tablet computer or tablets. Such embodiments include a protective cover that can be attached to, and protect, a surface of such a wireless device without negatively impacting the performance of the wireless device or affecting other functions of the wireless device.

Some known protective covers can be applied on the wireless devices to cover and protect an exterior surface and/or other portions of the wireless devices. Such known protective covers, however, typically affect RF (radio frequency) transmission or some other functions of the wireless devices. For example, some of the known protective covers can affect a proximity sensing function performed by an embedded antenna of a wireless device, thus limiting RF transmission from the wireless device. In another example, known protective covers can change the environment proximate to an antenna, such that a change in the dielectric or impedance match causes the antenna to function less efficiently, reducing transmission power of the antenna.

Accordingly, a need exists for an apparatus that can provide protection to an exterior surface of a wireless device without affecting the proximity sensing function performed by and/or the power transmitted by an embedded antenna of that wireless device.

SUMMARY

In some embodiments, an apparatus includes a protective cover configured to attach to a wireless device having an exterior surface. The surface includes a first portion and a second portion mutually exclusive from the first portion. The second portion of the surface is associated with at least a portion of an antenna of the wireless device that performs proximity sensing for the wireless device. The protective cover is configured to cover the first portion of the surface when the protective cover is attached to the wireless device. The protective cover is configured to not cover the second portion of the surface when the protective cover is attached to the wireless device. As a result, the proximity sensing and/or the power transmitted by the antenna is not affected by the protective cover when the protective cover is attached to the wireless device and when the wireless device is operational.

BRIEF DESCRIPTION OF THE DRAWINGS

FIG. 16 is a front view of a protective cover for a wireless device, according to an embodiment.

FIG. 17 is a side view of the protective cover shown in FIG. 16.

FIG. 18 is a perspective view of the protective cover shown in FIGS. 16 and 17, when the protective cover is attached to the wireless device.

FIGS. 19-21 are a side view, a rear view and a side view, respectively, of a protective cover for a wireless device, according to another embodiment.

FIGS. 22-25 show an assembly view, a front view, a right side view and a side perspective view, respectively, of a protective cover for a wireless device, according to an embodiment.

FIGS. 26-33 show a front view, a top view, a left side view, a bottom view, a right side view, a rear view, a front perspective view and a side perspective view, respectively, of a protective cover for a wireless device, according to an embodiment.

DETAILED DESCRIPTION

Figure 1:
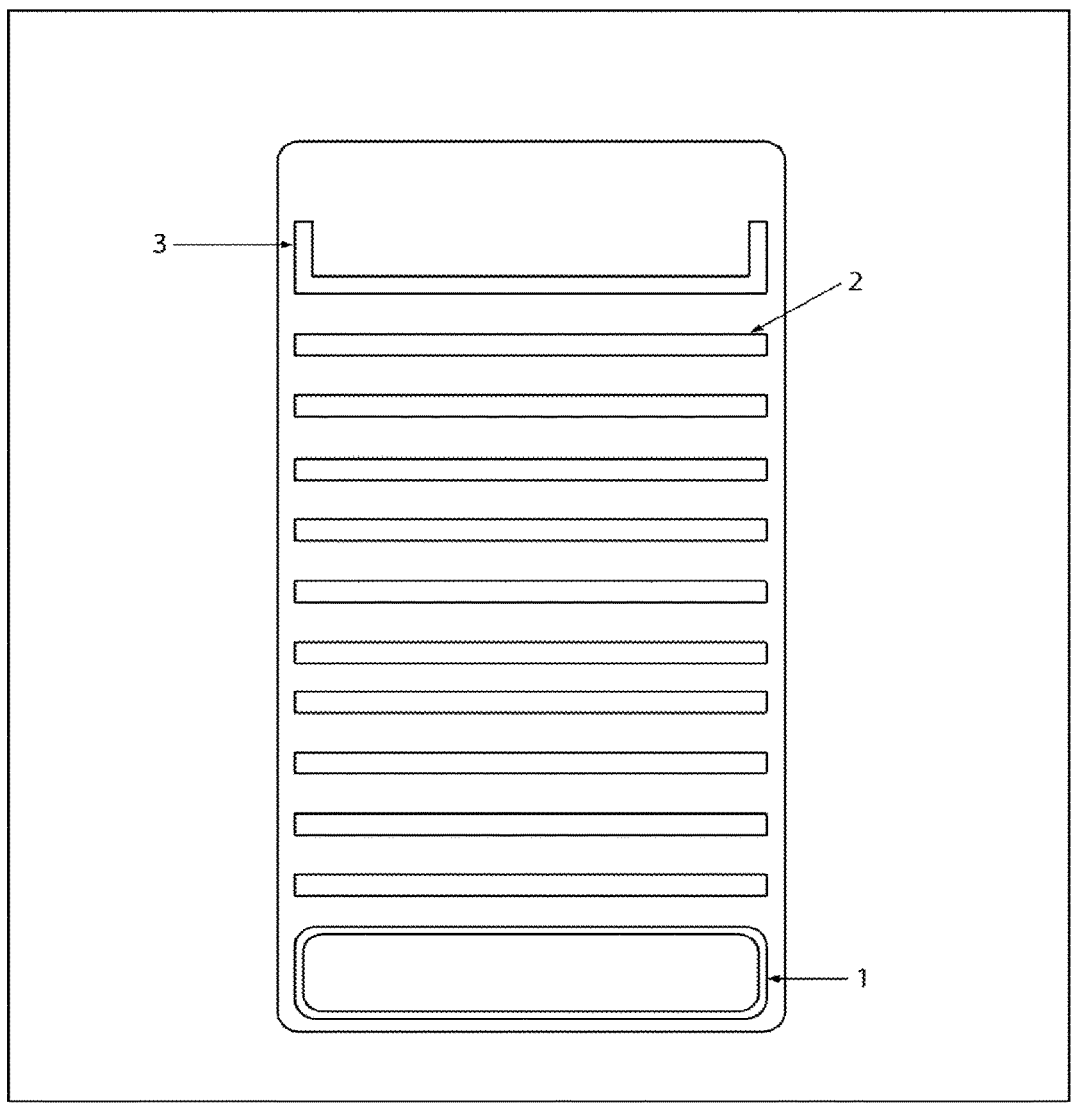
FIG. 1 shows RF coupling elements mounted on the back of a mobile telephone.

In some embodiments, external coupling antennas are provided to couple radiation from the internal antenna of a wireless device and to redirect the radiation such that a reduced or minimum amount of radiation is directed towards the user and an increased or maximum amount of radiation is directed away from the user. Note that this coupling method does not require an actual physical connection between the external coupling antennas and the antenna internal to the phone. The position of the coupling antenna with respect to the internal antenna, however, can be important. Through a series of coupling loops, directing elements or patch antennas located on a cover or case, a "clip" structure, or directly on an external surface of the mobile device, the radiation is further directed away from the user's head (which is absorptive) to the environment for communication to cell towers or a Wi-Fi router.

The materials used for coupling and re-directional elements are generally made out of materials of high electrical conductivity. Dielectric materials, however, can also be used to achieve optimal physical sizes and spacing of various elements.

In some embodiments, an apparatus includes a protective cover configured to attach to a wireless device having a surface including a first portion and a second portion mutually exclusive from the first portion. The protective cover can be removably attached to the wireless device. In some embodiments, the protective cover is disposed between the surface of the wireless device and a user of the wireless device when the protective cover is attached to the wireless device and when the wireless device is used by the user. In some embodiments, the protective cover is substantially planar, and the wireless device can be a tablet computer device.

The protective cover is configured to cover the first portion of the surface when the protective cover is attached to the wireless device. In some embodiments, the protective cover is transparent such that the first portion of the surface is visible to a user of the wireless device when the protective cover is attached to the wireless device. In some embodiments, the first portion of the surface includes at least one of a screen of the wireless device or a touchscreen of the wireless device.

The second portion of the surface is associated with a proximity sensor of the wireless device. The protective cover is configured to not cover the second portion of the surface when the protective cover is attached to the wireless device such that the proximity sensor is not triggered by the protective cover when the protective cover is attached to the wireless device and when the wireless device is operational. As a result, a total radiated power (TRP) of the wireless device is not reduced when the protective cover is attached to the wireless device and when the wireless device is operational.

In some embodiments, the second portion of the surface is associated with a camera of the wireless device. The protective cover is configured to not cover the second portion of the surface when the protective cover is attached to the wireless device such that a direct access to the camera is not blocked by the protective cover when the protective cover is attached to the wireless device.

The above procedures and apparatus are illustrated by the treatment of three exemplary wireless devices—the Apple 3G iPhone®, the RIM Blackberry® Curve 8300, and/or the Apple iPad®. The procedures and apparatus, however, are perfectly general and can be applied to any wireless device using different combinations of the elements described.

In some embodiments, an apparatus includes a protective cover configured to attach to a wireless device having an exterior surface. The surface includes a first portion and a second portion mutually exclusive from the first portion. The second portion of the surface is associated with at least a portion of an antenna of the wireless device that performs proximity sensing for the wireless device. The protective cover is configured to cover the first portion of the surface when the protective cover is attached to the wireless device. The protective cover is configured to not cover the second portion of the surface when the protective cover is attached to the wireless device. As a result, the proximity sensing is not affected by the protective cover when the protective cover is attached to the wireless device and when the wireless device is operational.

In some embodiments, an apparatus includes a protective cover configured to be disposed with a wireless device having an antenna. At least a portion of the antenna is configured to function as a proximity sensor for the wireless device. The protective cover, when being disposed with the wireless device, covers a portion of an exterior surface of the wireless device without affecting the proximity sensor and without reducing a TRP of the wireless device during use. At least a portion of the protective cover has a size and a shape that substantially correspond to a size and a shape of the portion of the exterior surface of the wireless device.

In some embodiments, an apparatus includes a planar sheet of material having a first surface and a second surface. The planar sheet is configured to be disposed with a wireless device having an exterior surface including a first portion and a second portion. The second portion of the exterior surface of the wireless device is associated with an antenna of the wireless device that is configured to function as a proximity sensor for the wireless device. When the planar sheet is disposed with the wireless device, the second surface of the planar sheet is disposed between the first surface of the planar sheet and the wireless device. When the planar sheet is disposed with the wireless device, the planar sheet of material covers the first portion of the exterior surface of the wireless device and not the second portion of the exterior surface of the wireless device. As a result, the proximity sensor is not affected by the planar sheet of material when the planar sheet is disposed with the wireless device and when the wireless device is operational.

Figure 2:
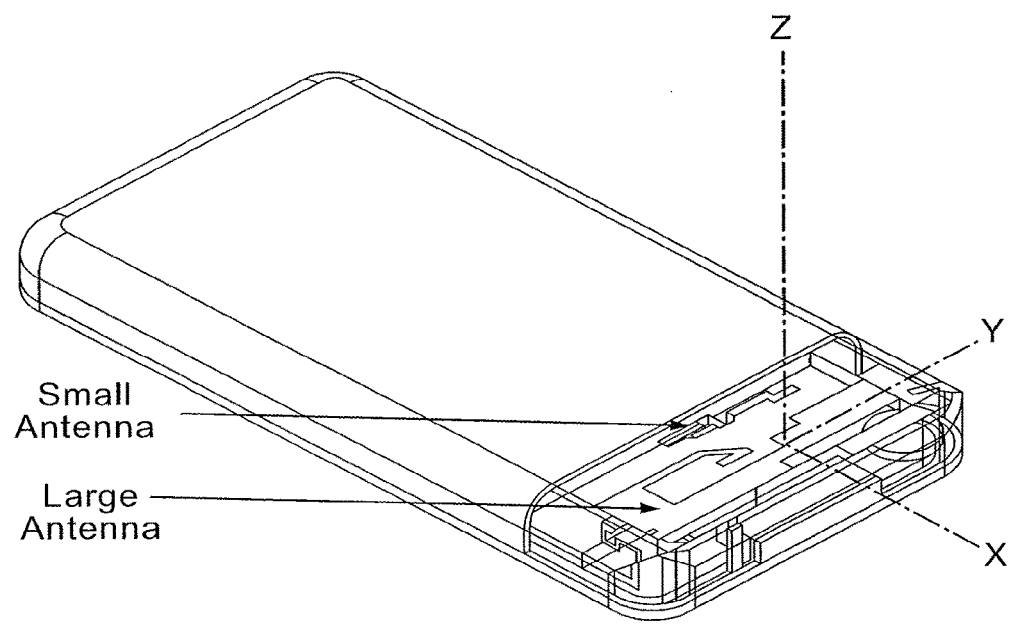
FIG. 2 shows a perspective view of a mobile telephone with placement of small and large antennas.

FIG. 1 shows RF coupling elements mounted on the back of a wireless device such as a mobile telephone. The radiation from an internal antenna (not shown in FIG. 1) of the wireless device is directed away from the user and outward at the back of the wireless device through a coupling loop 120 mounted on the back of the wireless device. The coupling can be achieved through, for example, electromagnetic (EM) induction as revealed by laboratory experiments and computer modeling of various physical quantities (e.g., antennas, connectors, circuit elements, ground planes, etc.) inside the wireless device such as an Apple iPhone®, as illustrated in FIG. 2. The EM fields are then successively coupled up a "ladder" of metallic strips 120 up the backside of the iPhone® enclosed inside the case. The placement of the coupling loop 110 with respect to the antenna inside the wireless device can be specific to that wireless device. As shown in FIG. 1, the horizontal metallic strips may be straight, or may have regular or irregular shapes such as "U" shaped metallic element 130, whose dimensions are adjusted to fit the available space on the back of the wireless device, while achieving optimal coupling from the loop 110.

Figure 3:
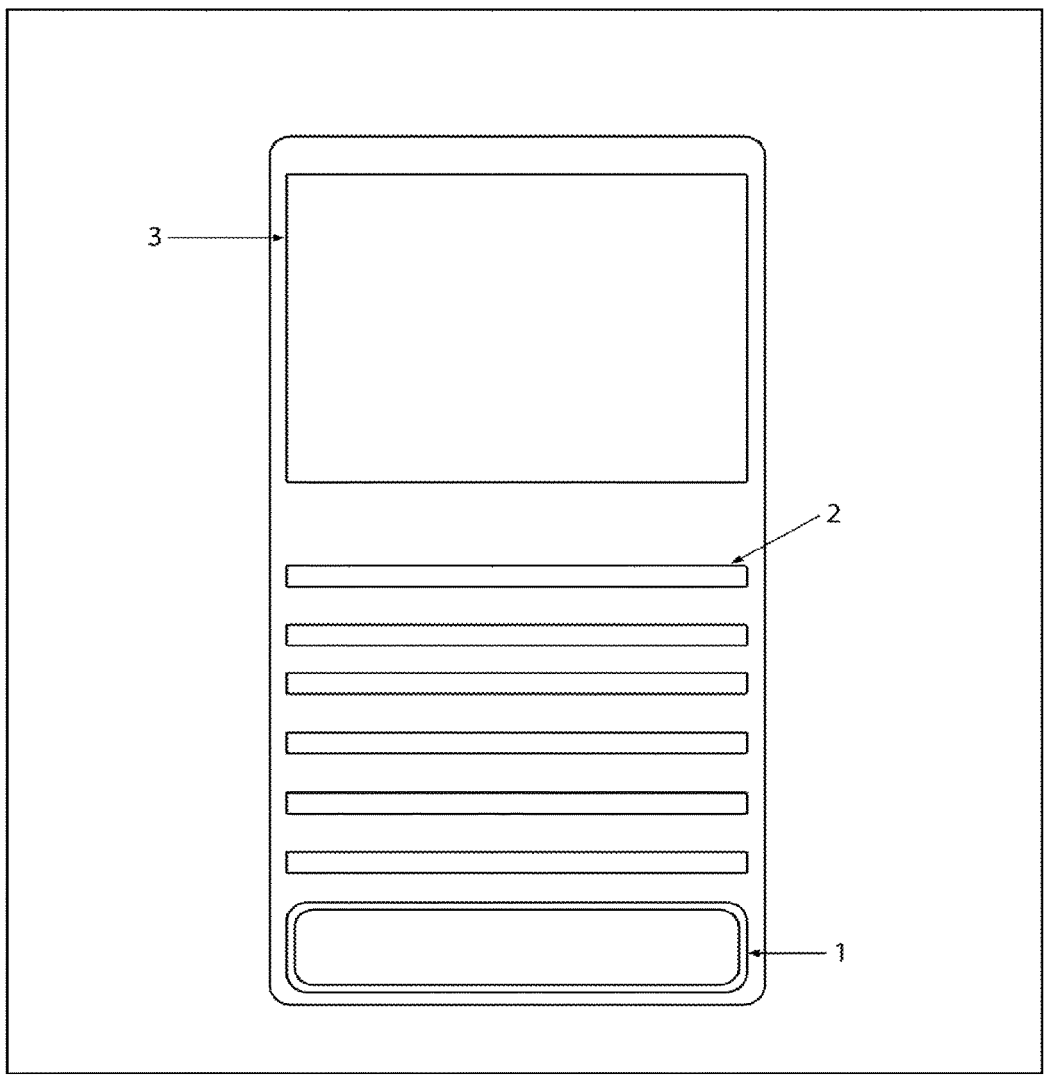
FIG. 3 shows an RF loop over an internal antenna of a mobile telephone.

One variation of the above design is in the replacement of an uppermost radiation re director by a single plate 330 as illustrated in FIG. 3. The use of a plate resembles a patch antenna whose radiation pattern favors the outward direction away from the user. The loop 310 can couple power out from the internal antenna, then the directors 320 can couple the power up to the plate 330, from which the radiation can be directed outward from the wireless device in the direction opposite to the user's body (e.g., head).

Figure 4:
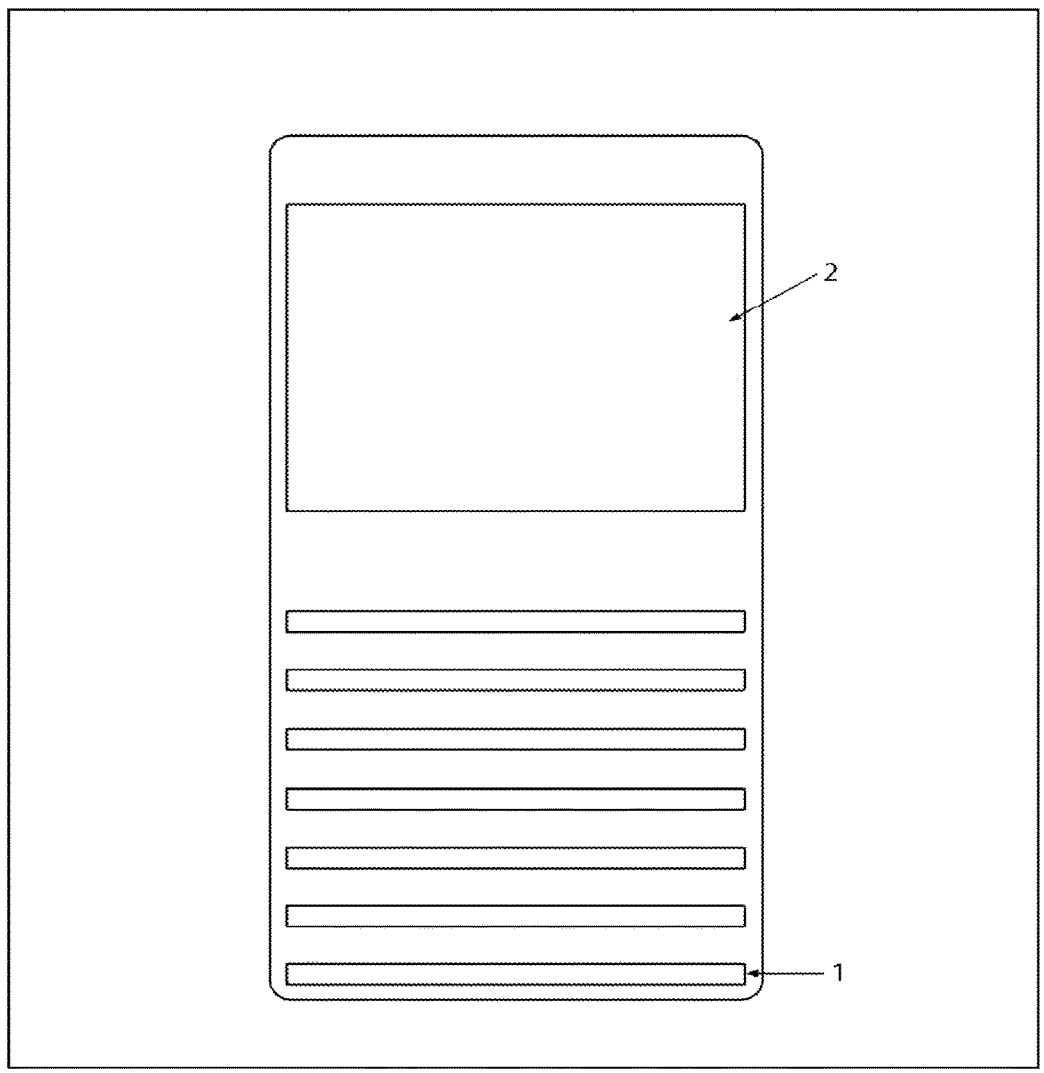
FIG. 4 shows an RF coupling parasitic device mounted on the back of a mobile telephone.
Figure 5:
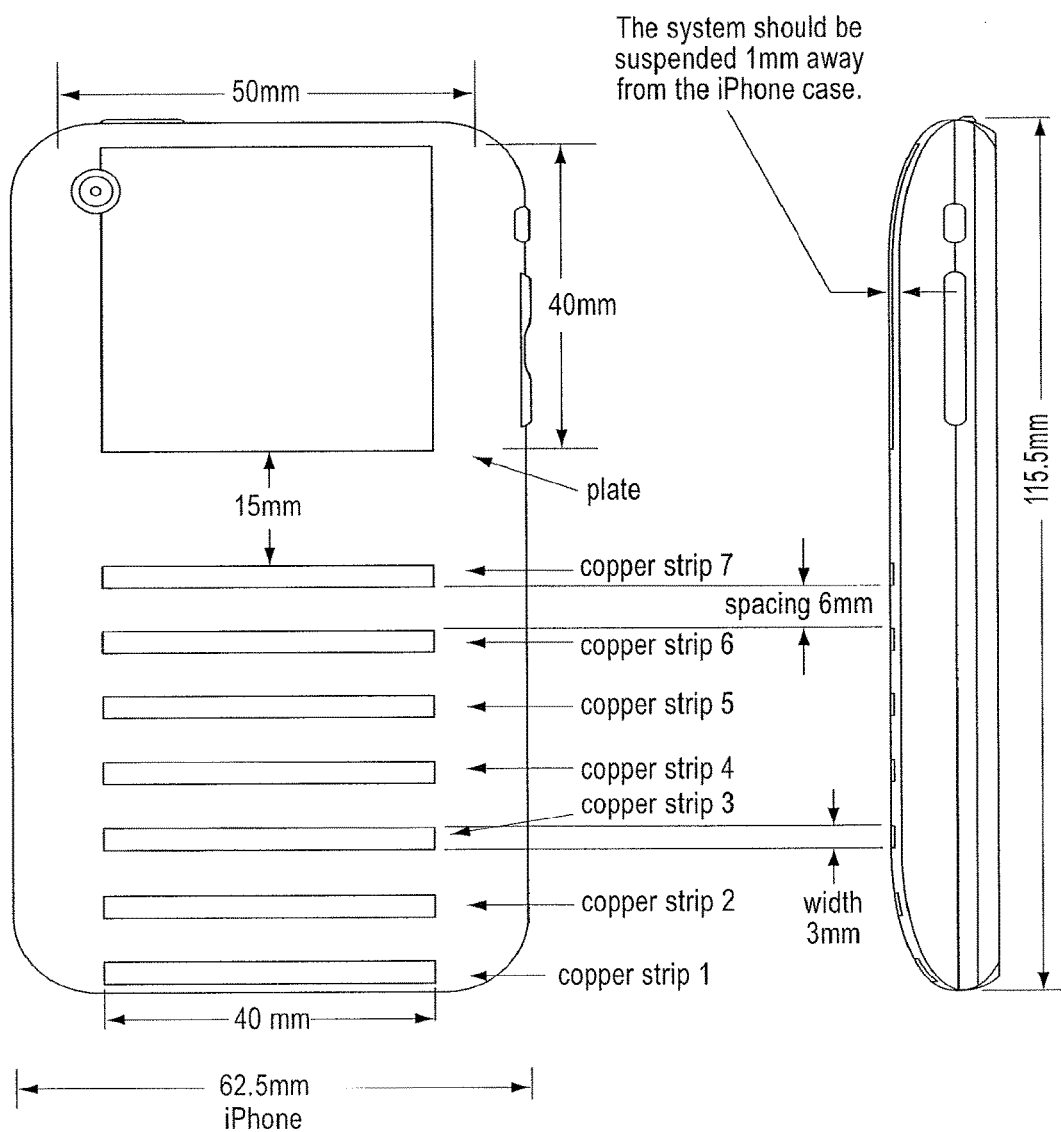
FIG. 5 shows a front and side view of a "ladder and plate" RF coupling design for a mobile telephone.

Another variation, illustrated in FIG. 4, as well as in FIG. 5, which depicts an application of this design to the Apple iPhone® 3G, is the replacement of the coupling loop by an RF coupling parasitic redirector composed of horizontal strips 410 that form a ladder-like array leading to a rectangular plate 420 above the ladder. In some embodiments, such configurations can significantly reduce the amount of radiation directed towards a user while maintaining or even enhancing the total radiation power of the wireless device.

Figure 6:
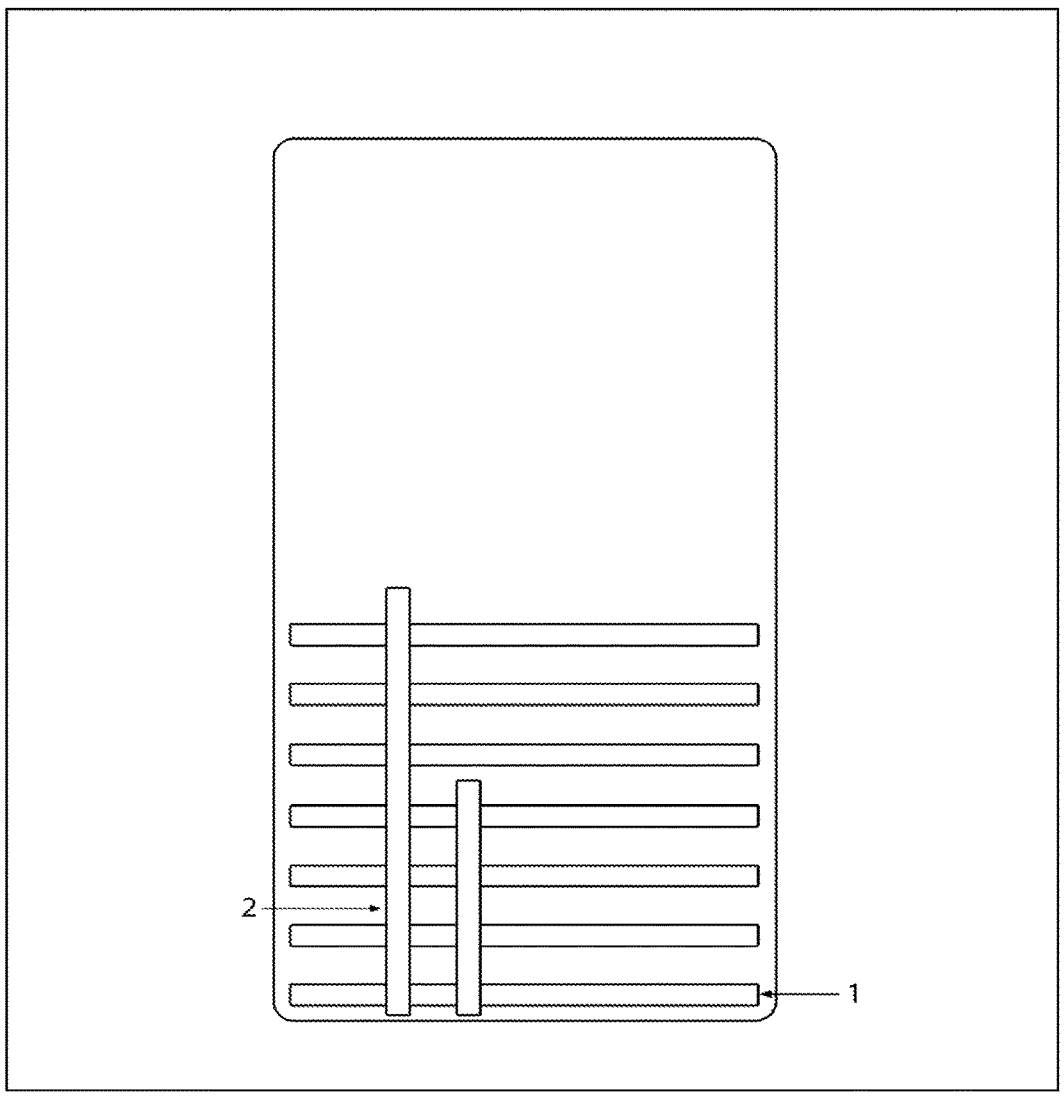
FIG. 6 shows an alternate embodiment of an RC coupling parasitic device mounted on the back of a mobile telephone.

A further embodiment is the use of vertical strips 620 that are orthogonal to the horizontal strips 610, as shown in FIG. 6. These vertical strips can be coupled to a vertical polarization of the radiation from the internal cell phone antenna. Thus, both the vertical polarization and the horizontal polarization can be coupled to fully (or substantially fully) redirect the maximum amount of RF radiation from the internal antenna of the wireless device away from the direction of the user. The vertical strips 620 are placed in a layer above the horizontal strips 610 such that the vertical strips provide additional coupling with any corresponding vertical elements of the internal antenna.

Figure 7:
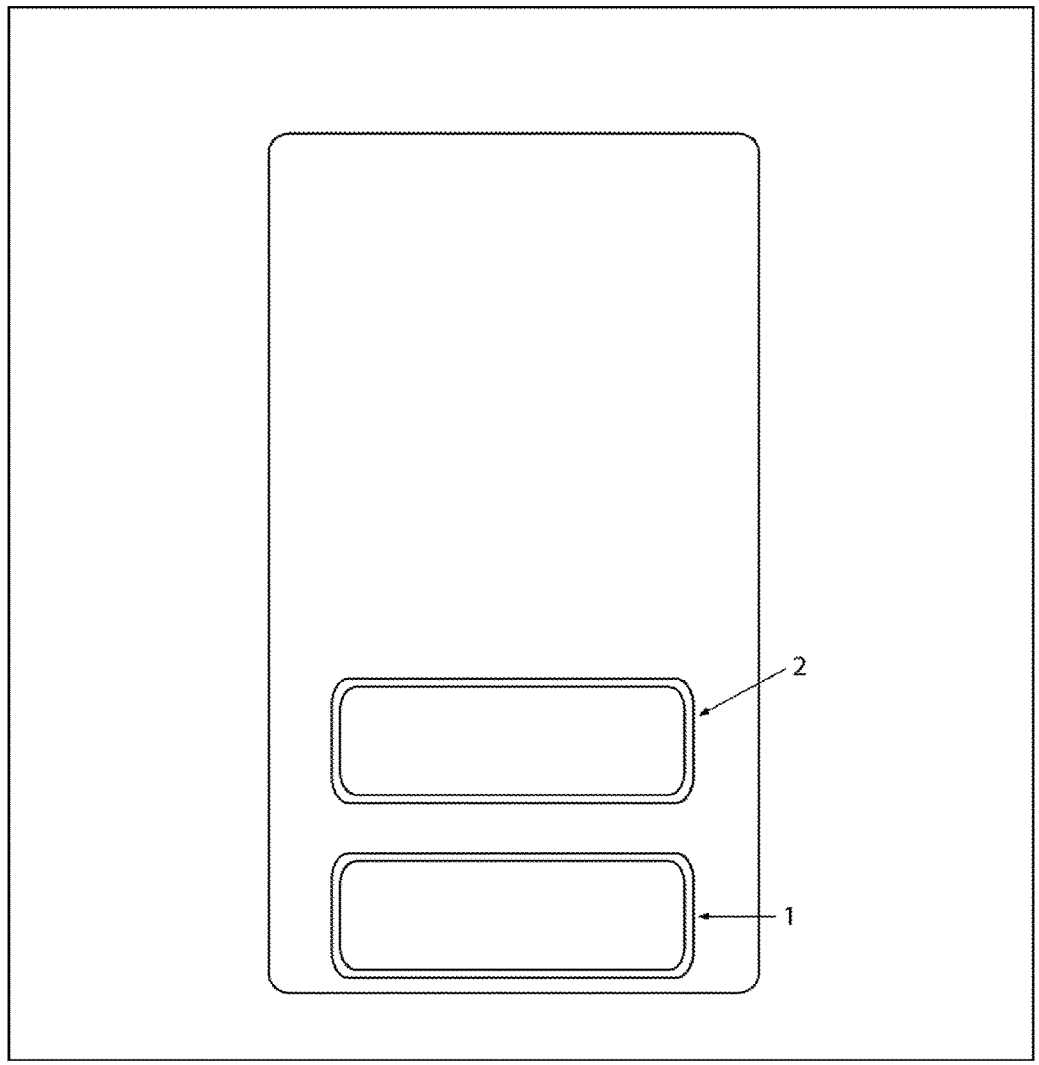
FIG. 7 shows a pair of RF coupling devices in the form of first and second loops mounted on the back of a mobile telephone.
Figure 8:
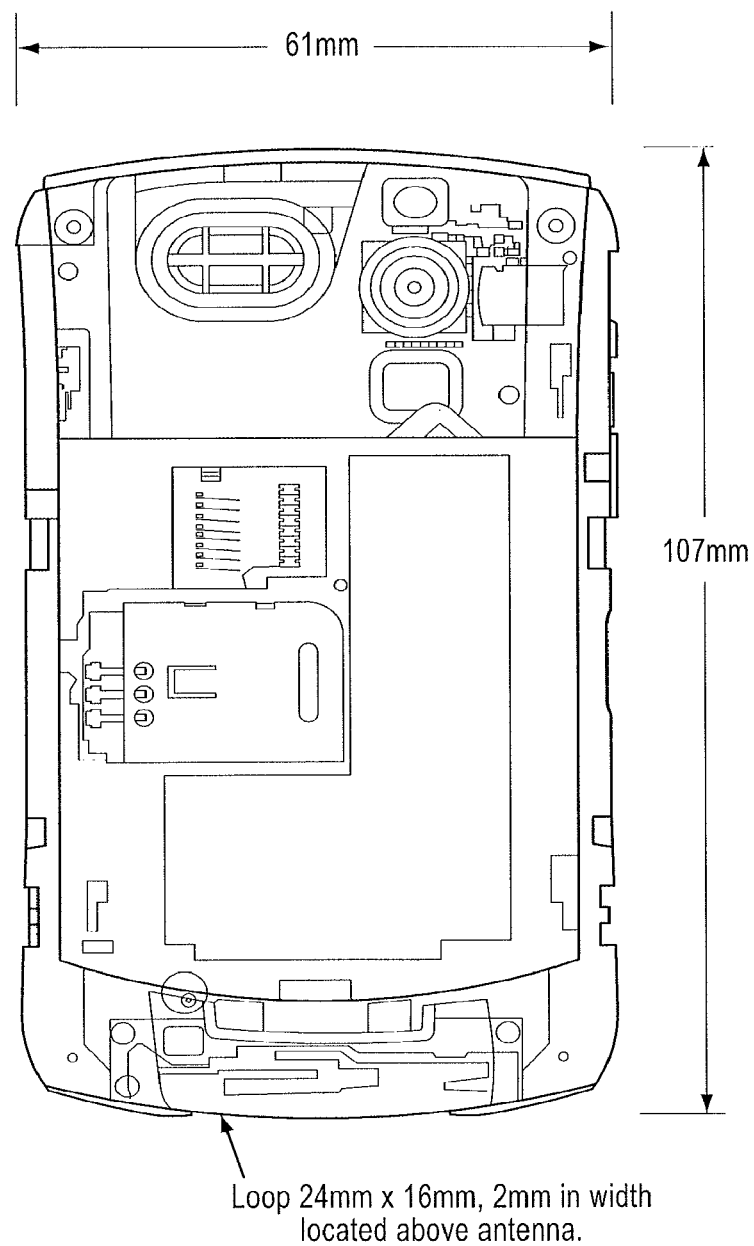
FIG. 8 shows a partial phantom view of an RF coupling loop design where the loop is mounted above the internal antenna of a mobile telephone.

In some embodiments, a simpler approach as illustrated in FIG. 7 can be applied to the internal components of some wireless devices such as the Blackberry® 8300 shown in FIG. 8. As shown in FIG. 7, a single loop 710 is placed over the location of the internal antenna, and may be augmented by a second loop 720 above the first loop 710. The first loop 710 couples the RF field from the internal antenna, and the second loop 720 provides additional redirected radiation away from the user. Size and spacing can be tuned to the particular wireless device. For the Blackberry® 8300, for example, a loop of 24 mm×16 mm×2 mm can be placed such that it wraps under the bottom of the phone by 2 mm as shown in FIG. 8. In some embodiments, such a configuration can produce ideal results in terms of redirecting radiation away from a user as verified by independent laboratory testing by CETECOM in Milpitas, Calif.

Figure 9:
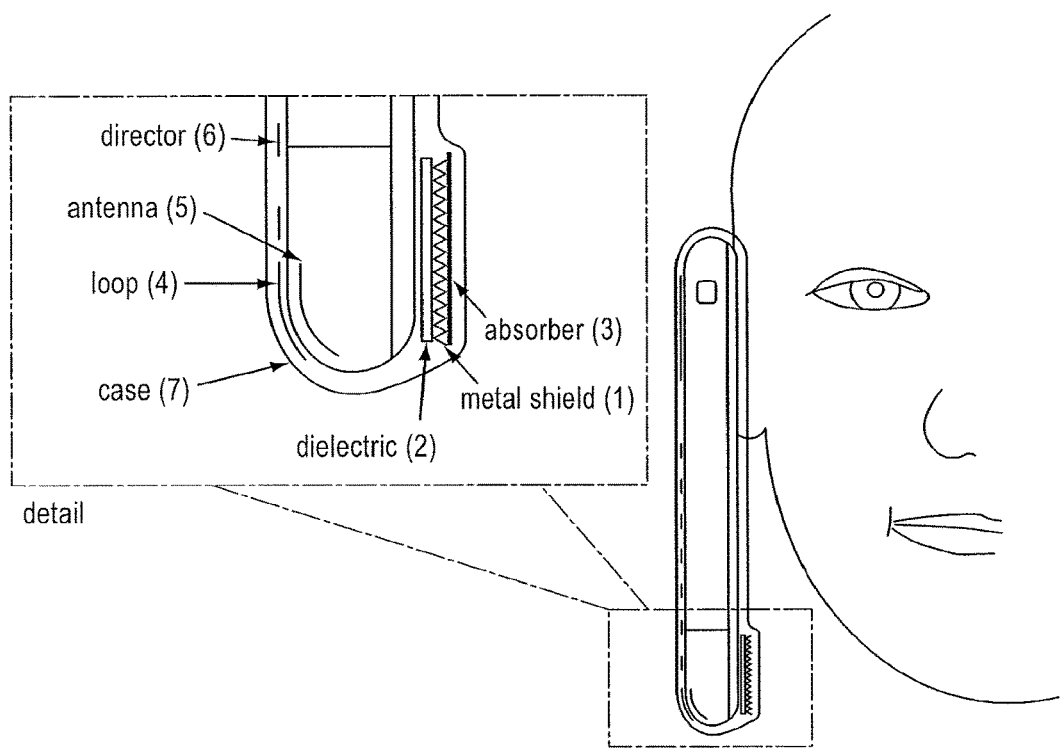
FIG. 9 shows a mobile telephone external case design including a reflective shield at the front side of the device and a radiation coupling device at the rear side of the device.
Figure 10:
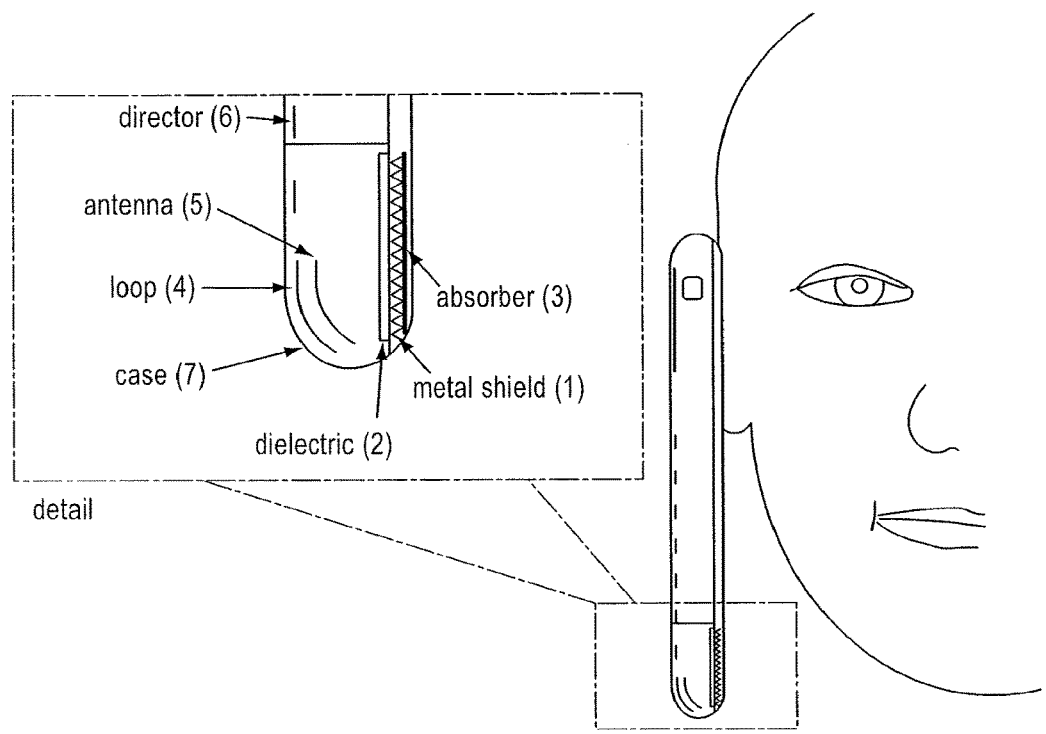
FIG. 10 shows an alternate embodiment of FIG. 9 wherein an RF redirection system is integrated into the internal design of a wireless device.

In another embodiment shown in FIGS. 9 and 10, a shield comprising a corrugated metallic surface is provided, either incorporated into a protective case (FIG. 9), or integrated directly into the body of the wireless device itself (FIG. 10). The metallic shield can be located on the user side of the wireless device directly in front of the internal antenna. Such a shield can also be installed inside the wireless device. Such a corrugated surface can give rise to many image dipoles, thereby providing a wide pattern of scattered radiation. The particular shape and size of corrugations can be designed to scatter radiation, which normally would be incident upon the user, in directions away from the user as widely as possible. In some embodiments, the scattering angles from the incident wave vector can range from +/−40 to +/−180 degrees.

In some embodiments, sizes of the corrugations are smaller than wavelengths of microwave frequencies transmitted from the wireless device. As a result, such corrugations can introduce scattering wave vectors that are greater than the incident wave vector in directions perpendicular to the incident wave vector. Thus, such corrugations can deflect the radiation away from the user and at the same time avoid creating reflections back on the internal radiating antenna. As a result, the impedance seen by the output amplifier of the wireless device (e.g., a cell phone) is not affected and the total radiated power of the wireless device is not reduced, while the specific absorption rate (SAR) is significantly reduced. In such embodiments, the loop 940/1040 and the directors 960/1060 are positioned relative to the internal antenna 950/1050 such that the loop 940/1040 is close to the antenna and couples the RF power out from the back of the wireless device and up to the directors 960/1060.

As shown in FIG. 9, in a case 970, a layer of highly conductive corrugated metal shield material 910 is, optionally, combined with a layer of absorptive material 930 of a specific frequency range, placed on the side of the metallic shield opposite to the internal antenna, such that with the wireless device inserted into the external case the shield is positioned between the user's head and the internal antenna. The absorber 930 can substantially prevent the radiation that passes through the shield from reaching the user. Also, a layer of dielectric material 920 may be added between the internal antenna and the shield to reduce the spacing used to achieve an effective distance between the antenna and the shield. Such an effective distance can be, for example, ¼ wavelength of the RF radiation.

The redirection of RF radiation away from the user's head can also be achieved by the use of a properly located passive RF coupling redirector including the elements 940-960 as shown in FIG. 9, in combination with the corrugated shield of highly conductive metallic material 910. An alternate embodiment as shown in FIG. 10 may have the RF redirector including the elements 940-960 and the metallic shield 910 integrated within the wireless communication device itself.

A feature of various embodiments, both as a passive directional beam antenna alone, or in combination with a passive re-directional shield, incorporated in an external case for a wireless device, or such combination incorporated internally in a wireless device, is that such embodiments direct/redirect radiation away from the user, out of the wireless device, reducing SAR, without adversely affecting power radiated from the back area of the phone. This is done with a directional antenna, or a combination of a directional antenna and re-directive shield, or with a re-directive shield only, integrated within a case of non-conducting or low-conductive materials (e.g., variously of silicone, plastic, cloth, etc.) that allow EM waves to propagate outward toward, for example, the cell phone tower without suffering any attenuation.

Figure 11:
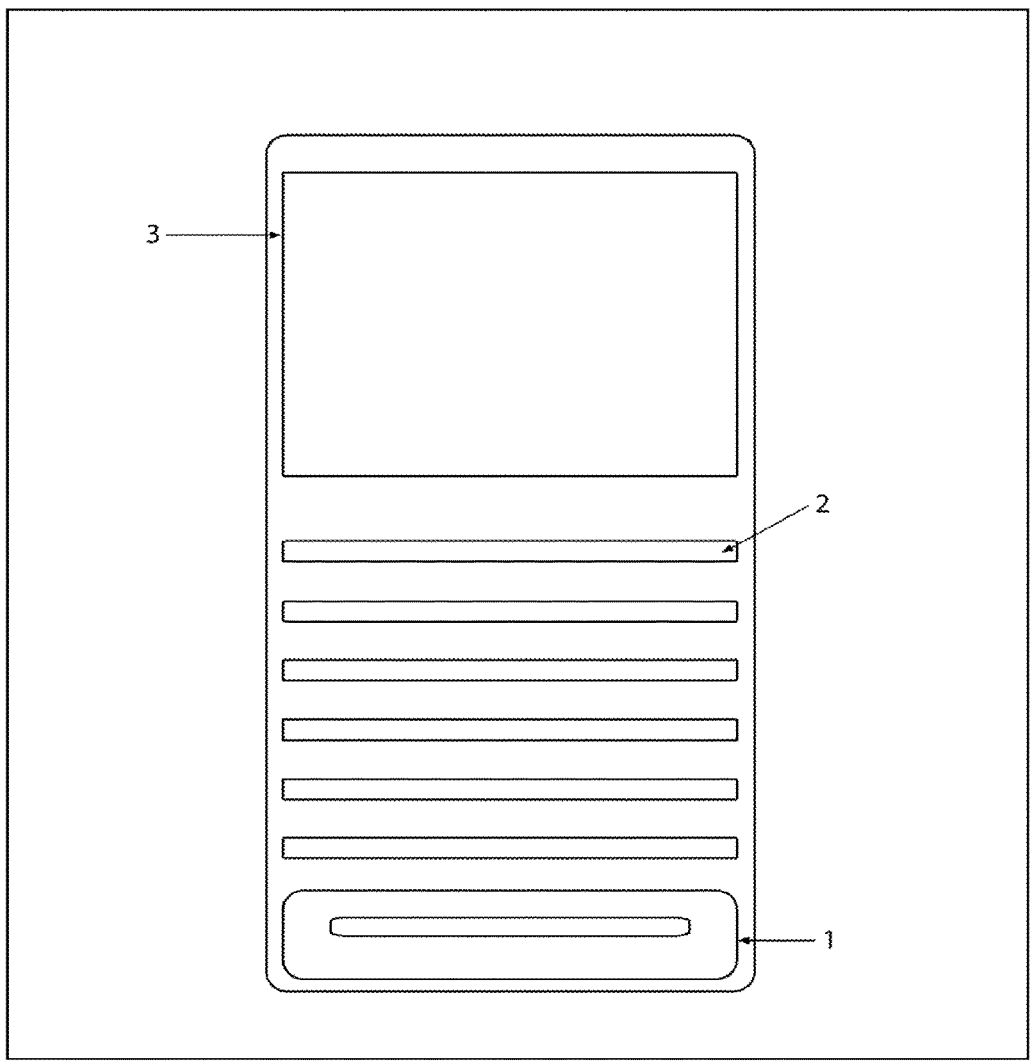
FIG. 11 shows an alternate embodiment of an RF loop design mounted on the back of a mobile telephone device.

A further alternate embodiment of the RF coupling radiation redirector is shown in FIG. 11. Here, a loop 1110 consists of a metallic sheet with a narrow slot having a length and width tuned to, for example, ¼ of the wavelength of the transmitting RF radiation. For example, a 1900 MHz transmission would correspond to a 40 mm slot length.

Figure 12:
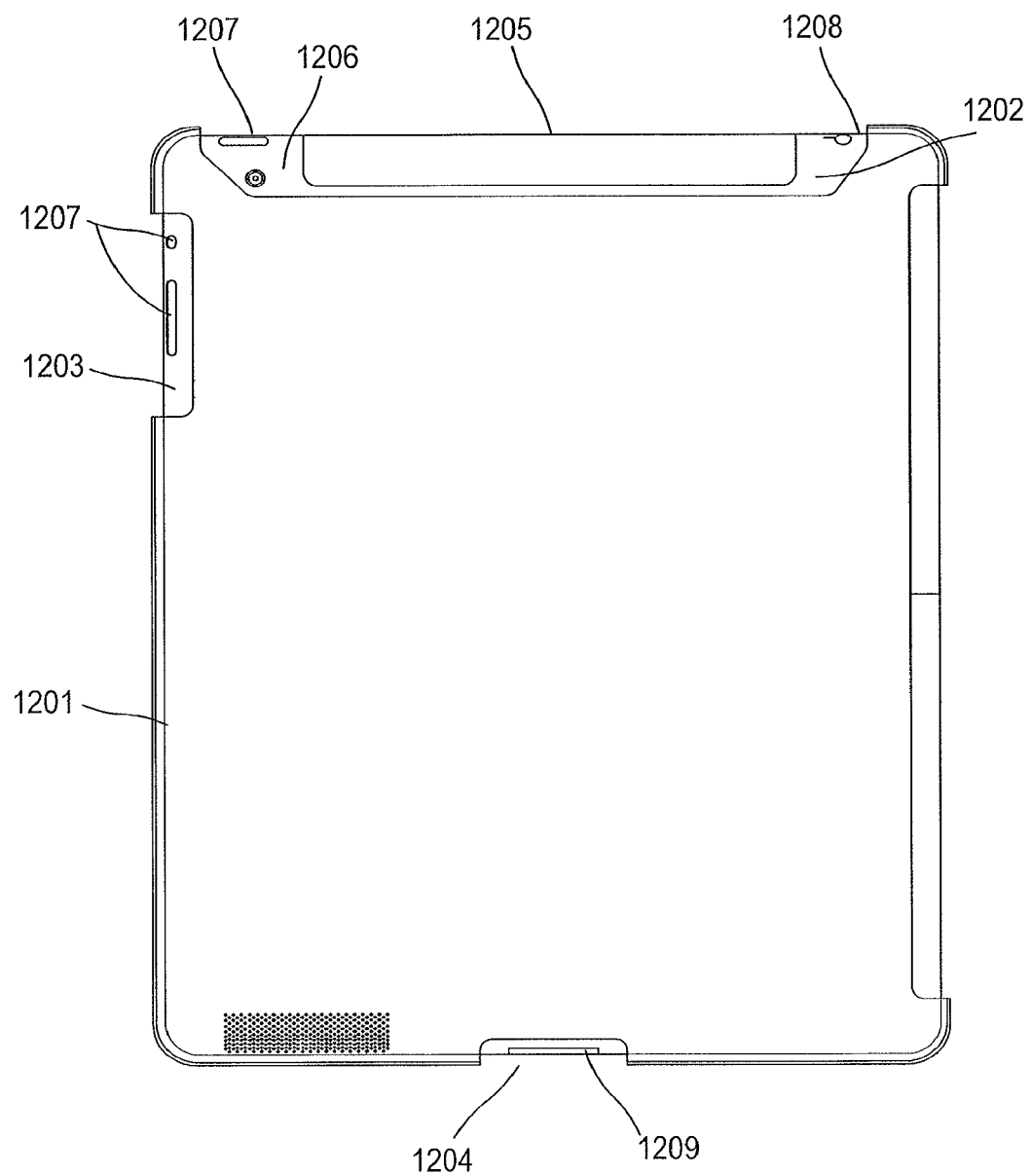
FIG. 12 shows a tablet computer external case design according to one embodiment.

FIG. 12 shows one embodiment of an external case 1201 for a wireless device such as a tablet computer (e.g., an Apple iPad®). The case 1201 can be made of a sturdy material such as polycarbonate. The case 1201 contains a number of cut-out sections 1202, 1203 and 1204, to allow access to a video camera 1206, various switches 1207, headphone jack 1208, and input/power interface 1209. Moreover, the cut-out section 1202 leaves plastic strip 1205 exposed. The plastic strip 1205 is provided on tablet computers having 3G or other mobile telephony capability. This plastic strip 1205 is located over an internal 3G or other mobile telephony antenna, and is provided to enable mobile telephony signals to reach the internal mobile telephony antenna and to enable transmission signals to leave the wireless device.

In conjunction with the plastic strip 1205 being located over an internal mobile telephony antenna, a capacitive proximity sensor (not shown in FIG. 12) may be attached to or disposed proximate to the plastic strip 1205. When a user's body part such as a hand or a lap contacts the strip 1205, the proximity sensor is activated, causing the TRP of the wireless device to be limited. The purpose of lowering the maximum TRP is to lower the SAR experienced by the user when using the wireless device in mobile telephony applications. As explained above, however, the reduced TRP reduces the RF signal transmission power, and consequently degrades communication quality. As shown in FIG. 12, the external case 1201 does not cover the mobile antenna strip 1205, thus not causing any constant reduction in transmission signal quality whenever the external case 1201 is used with the device.

Accordingly, the case 1201 defines a cut-out section 1202 in the location of the strip 1205, which covers the internal mobile telephony antenna. In this way, use of the external case 1201 does not affect the TRP produced by the tablet during mobile telephony applications (such as telephone calls, Internet applications, video conferencing, etc.).

Figure 13:
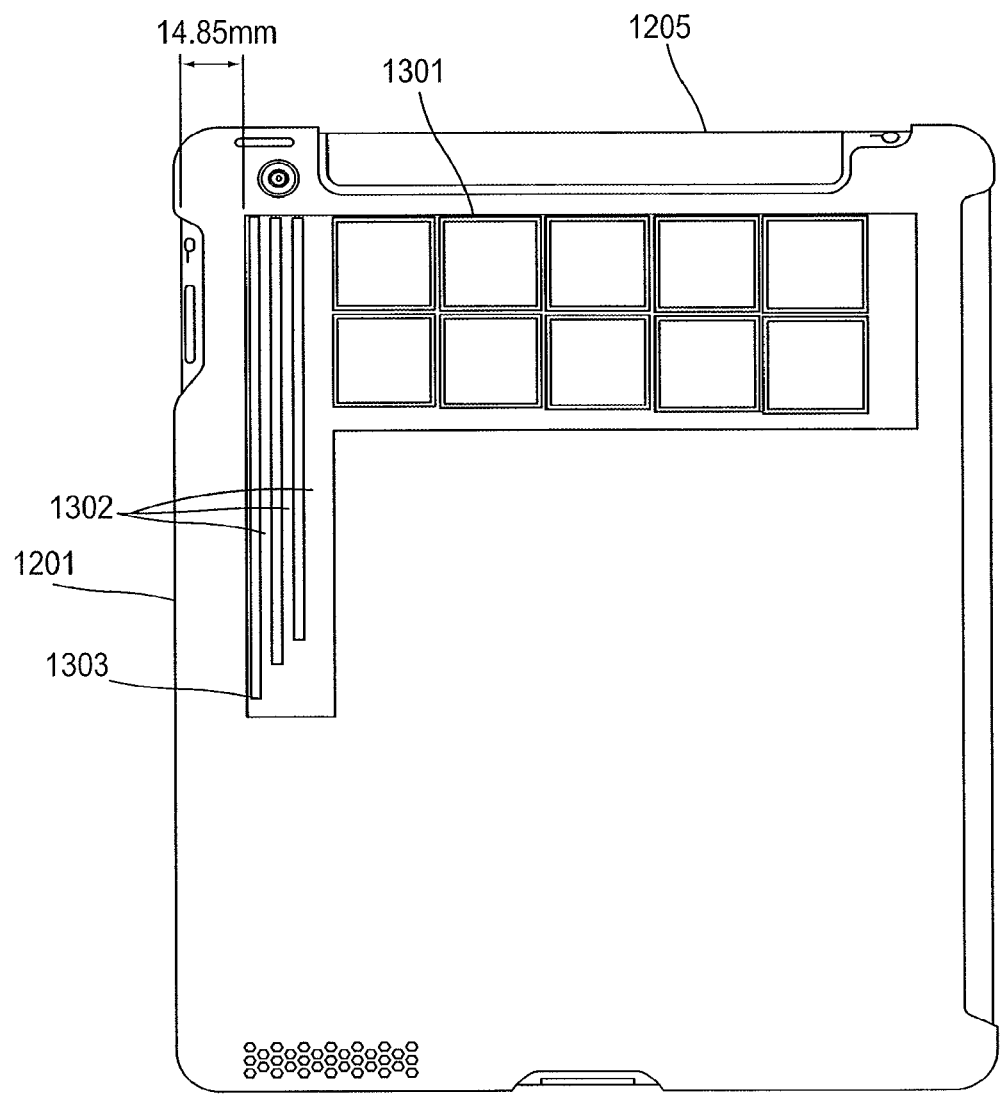
FIG. 13 shows details of RF radiation redistribution elements embedded in the external case of FIG. 12.
Figure 14:
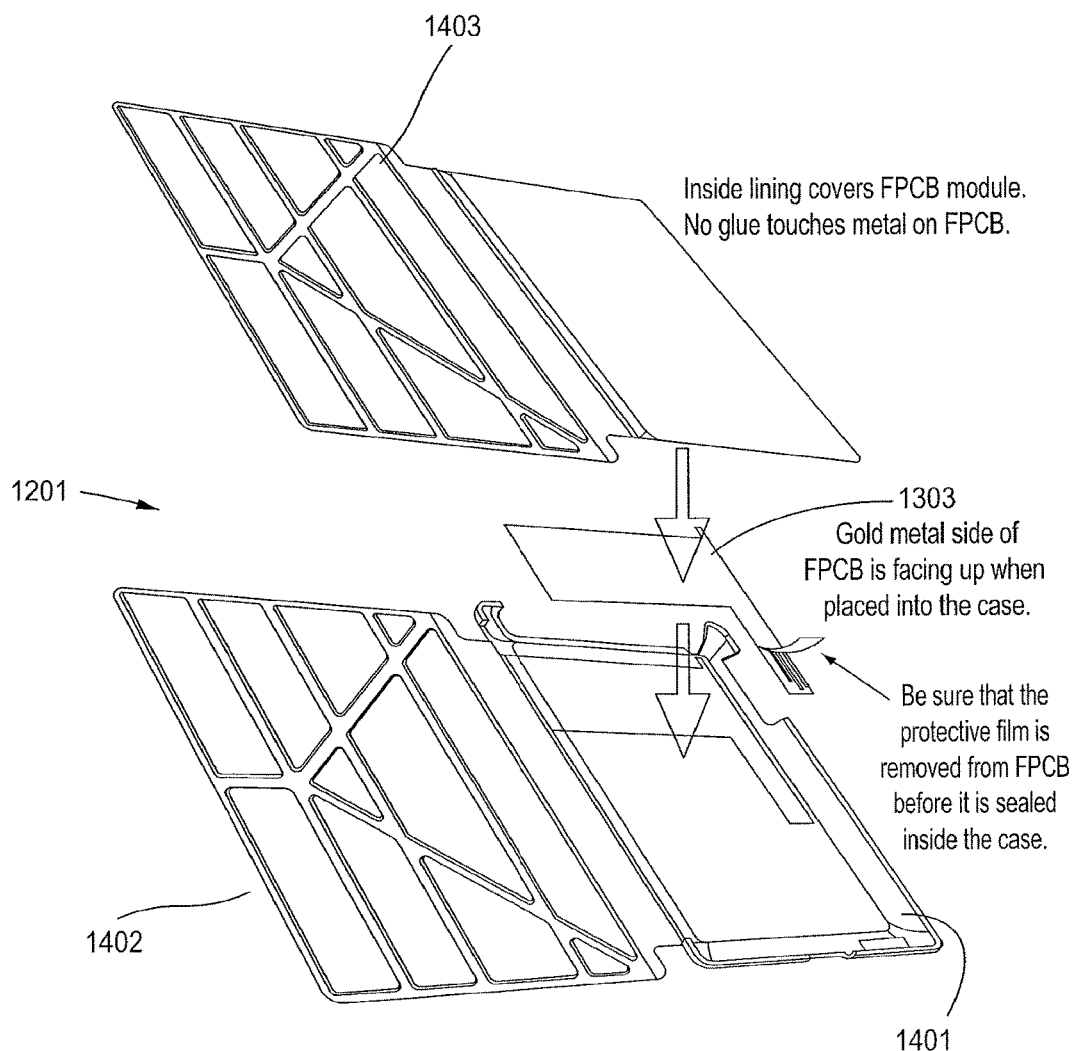
FIG. 14 is an exploded view of various component parts of an external case for a tablet computer in accordance with one embodiment.

As shown in FIG. 13, a number of RF radiation redistribution components are embedded in the external case 1201. The radiation redistribution components may be in the form of resonant loops 1301 and radiation directors 1302. A Flexible Printed Circuit Board (FPCB) 1303 as shown in FIGS. 13 and 14 is embedded in a polycarbonate shell 1401 (FIG. 14), which holds the FPCB 1303 on the back of the tablet. Note that the resonant loops 1301, the radiation directors 1302 and the FPCB 1303 are shown in FIG. 13 for illustrative purpose, but would not normally be seen from the external case 1201.

The resonant loops 1301 can be made of 1 oz of copper elements upon a 2 mil thick polyimide substrate (the resonant loops are typically rectangular or square in shape, but may be formed in any desired shape). The loops 1301 have perimeters that substantially equal, for example, approximately 1 wavelength of the emitted RF transmission wave as it travels through the polycarbonate material, i.e., the loops 1301 are resonant with the RF transmission. Loop size is dependent on the frequency of the mobile or cellular telephony transmission and the dielectric constant of the material in which the FPCB is embedded. Often multiple loops of varying sizes exist to resonate with the different bandwidths and frequencies of cellular telephony transmission. These loops couple capacitively (i.e., passively) with the internal mobile telephony antenna.

Typically, the FPCB 1301 is located approximately 1 mm from the back surface of the tablet. This defines an antenna structure that is a combination of the internal mobile telephony antenna and the FPCB case-embedded antenna formed by the resonant loops and directors. This antenna structure has a much more directional radiation pattern than the internal mobile telephony antenna by itself (which has a substantially 360° radiation pattern). Because the antenna structure formed by the combination of the internal antenna and the case-embedded components has more radiative components located at the back of the device, the amount of radiation that was previously directed towards the user from the front of the device is substantially reduced.

Because the shape of the radiation pattern has changed, so that more power is emitted from the back of the phone than the front, little or no loss in communication ability or quality occurs in a typical talk configuration.

The FPCB may also contain directors 1302—copper strips that have lengths substantially equal to, for example, approximately ½ wavelength (or multiples thereof) of the RF waves emitted from the internal mobile telephony antenna. These directors 1302 provide a structure that spreads the coupled RF radiation from the internal mobile telephony antenna over a larger area or volume. The combination of resonant loops 1301 and directors 1302 provide a larger surface area or volume for cellular telephony emission, thereby reducing local intensity, while still substantially maintaining the power from the back of the phone.

Note that the tablet external case is not intended to merely change the directionality of the antenna emissions, but to redistribute or spread the RF radiation over a larger area or volume through a combination of resonant conductive loops and director elements inductively coupled to the internal mobile telephony antenna of the tablet device. The effect of such radiation redistribution is that local radiation intensity is significantly reduced while still substantially maintaining the power radiated from the back of the phone.

FIG. 14 illustrates an exploded view of the external case components. The case 1201 is formed of an external shell 1401, a cover 1402 and an inside lining 1403. A FPCB 1303 fits into the shell 1401 and is covered by the lining 1403.

Note also that the resonant loops 1301 and elongated directors 1302 may be incorporated directly with the tablet device itself, either internally or externally, without the use of an external case in alternative embodiments.

Figure 15:
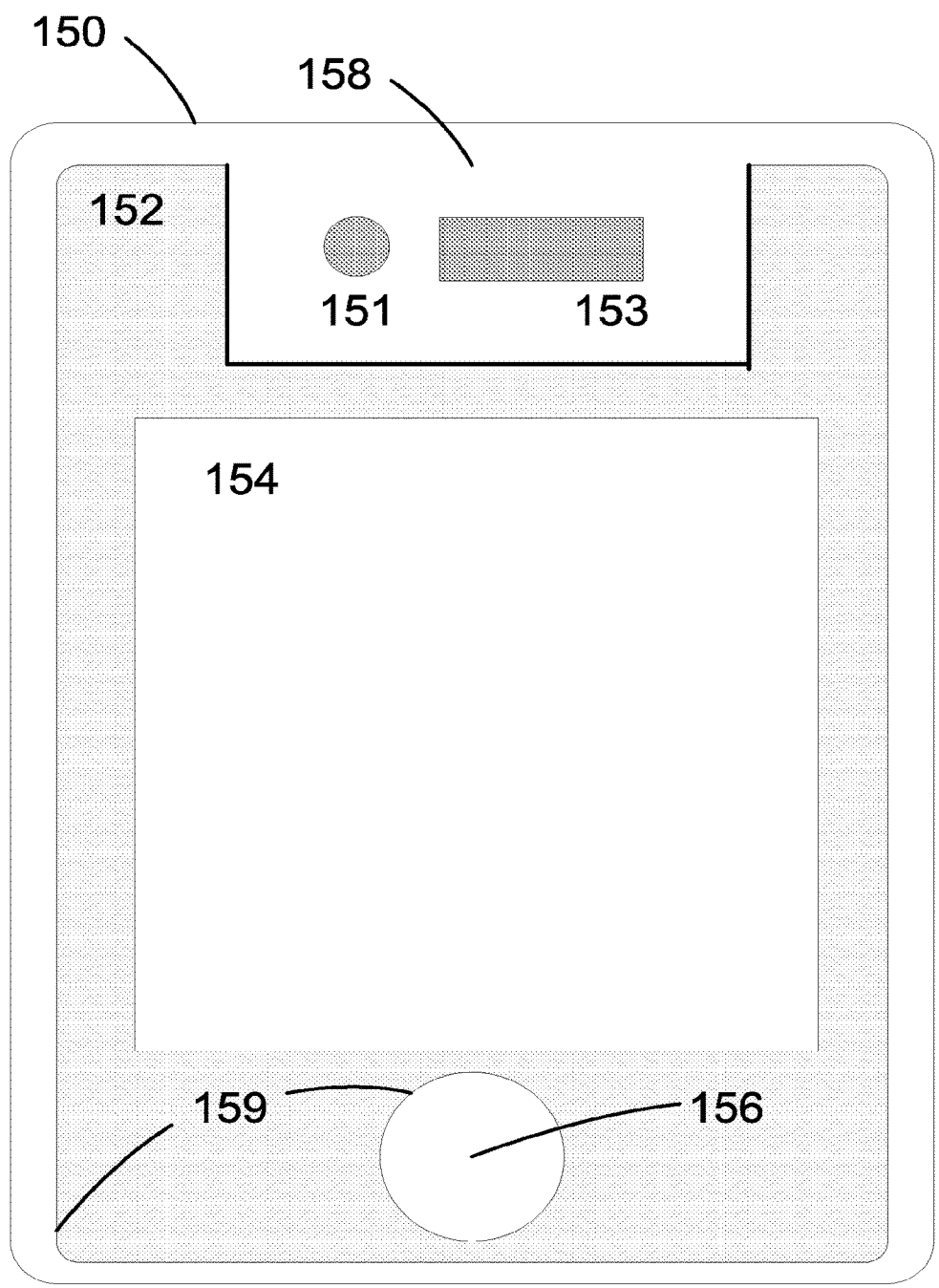
FIG. 15 is a schematic illustration of a protective cover for a wireless device, according to an embodiment.

FIG. 15 is a schematic illustration of a protective cover 152 for a wireless device, according to an embodiment. As described herein, such a wireless device can be a mobile communication device (e.g., a smart phone), a tablet computer device (e.g., an Apple iPad®), or any other type of portable device. Typically, the protective cover 152 is substantially planar. In other embodiments, the protective cover 152 can be in any non-planar form that is specifically adaptive to a surface (e.g., a non-planar surface) of the wireless device.

As shown in FIG. 15, the protective cover 152 can be attached to a surface 150 of the wireless device. The surface 150 can be an outer surface (e.g., a front surface) of the wireless device. In some embodiments, the protective cover 152 can be a planar sheet of material having a first surface (e.g., an outer surface) and a second surface (e.g., an inner surface). When the protective cover 152 is attached to the surface 150, the second surface of the planar sheet is disposed between the first surface of the planar sheet and the surface 150. That is, the second surface of the planar sheet is attached to the surface 150. Additionally, in some embodiments, the protective cover 152 is removably attached to the wireless device 150. That is, after being attached to the wireless device 150, the protective cover 152 can be detached from the wireless device 150.

The surface 150 includes a first portion that is covered by the protective cover 152 when the protective cover 152 is attached to the surface 150. Similarly stated, the protective cover 152 has a size and a shape that substantially correspond to a size and a shape of the first portion of the surface 150. In FIG. 15, that first portion is defined by the boundary 159. That is, the first portion includes the area inside the boundary 159, excluding the portion 156 and including the portion 154. When attached to the surface 150, the protective cover 152 is defined by a boundary that substantially corresponds to the boundary 159.

In some embodiments, the protective cover 152 is disposed between the first portion of the surface 150 and a user of the wireless device when the protective cover 152 is attached to the wireless device and when the wireless device is used by the user. For example, the surface 150 can be a front surface of a mobile telephone including an aperture associated with a speaker embedded within the wireless device, from which acoustic signals (e.g., voices, sounds) are sent out of the wireless device. The protective cover 152 is disposed between such a surface 150 and the body of a user (e.g., mouth, face, and ear) of the mobile telephone when the protective cover 152 is attached to the mobile telephone and when the user is using the mobile telephone for a phone call. For another example, the surface 150 can be a front surface of a tablet (e.g., iPad®) including a touchscreen of the tablet, through which a user of the tablet can view contents from the tablet and/or enter data into the tablet. The protective cover 152 is disposed between such a surface 150 and the body of the user (e.g., face, eyes) when the protective cover 152 is attached to the tablet and when the user is using the table (e.g., for reading an article, writing an email, etc.).

In some embodiments, the first portion of the surface 150 includes a screen 154, on which a user of the wireless device can view visual contents provided by the wireless device. Furthermore, in some embodiments, such a screen can be a touchscreen such that the user can enter information into the wireless device by touching the touchscreen. In both scenarios described above, the protective cover 152 is transparent such that the first portion including the screen and/or touchscreen is visible to the user when the protective cover 152 is attached to the wireless device. Additionally, when the protective cover 152 is attached to the surface 150 of the wireless device, the protective cover 152 covers the first portion (including the screen 154) such that the first portion of the surface 150 (including the screen 154) is protected by the protective cover 152 from, for example, scratching or other similar actions that can potentially damage the first potion of the surface 150.

The surface 150 also includes a second portion 158 that is not covered by the protective cover 152 when the protective cover 152 is attached to the first portion of the surface 150. The second portion 158 is mutually exclusive from the first portion of the surface 150. In some embodiments, the second portion 158 is associated with a proximity sensor of the wireless device. Such a proximity sensor can be any type of sensing device configured to detect an object (e.g., a body of a user) when that object is within a certain distance to the sensing device. In some embodiments, the proximity sensor can be, for example, a capacitive or distance sensor, a light sensor, a temperature sensor, a combination of various sensors, and/or the like.

As shown in FIG. 15, the second portion 158 includes an aperture 153 associated with the proximity sensor that is embedded in the wireless device. Whenever an object (e.g., a hand or a body of a user) is within a certain distance (e.g., 10 mm) to the aperture 153 in a certain range of angles (e.g., in the direction perpendicular to the surface 150), the object can be detected by the proximity sensor and as a result, the proximity sensor is triggered. In some embodiments, as a result of the proximity sensor being triggered, operations of the wireless device can be affected. For example, transmission from the wireless device can be restrained such that a TRP of the wireless device is reduced. For another example, the wireless device can enter a sleep mode or a screen of the wireless device (e.g., the screen 154) can be dimmed. Furthermore, in some embodiments, the second portion 158 is also associated with other functions and/or components of the wireless device. For example, as shown in FIG. 15, the second portion 158 includes an aperture 151 associated with a camera that is embedded in the wireless device.

When the protective cover 152 is attached to the surface 150 of the wireless device and when the wireless device is operational, as a result of the protective cover 152 not covering the second portion 158, the apertures 151 and 153 are not covered by the protective cover 152. As a result, the proximity sensor is not triggered, and a direct access to the camera is not blocked. Thus, the camera and/or other functions and components of the wireless device can operate normally without any obstruction caused by the protective cover 152.

Additionally, in some embodiments, the surface 150 includes a third portion 156 that is mutually exclusive from the first portion and the second portion 158 of the surface 150. Such a third portion 156 can include element(s) of the surface 150 that is to be touched by a user of the wireless device when the user operates the wireless device. The protective cover 152 is configured not to cover the third portion 156 when the protective cover 152 is attached to the wireless device, such that the user can operate the wireless device by touching the third portion 156 when the protective cover is attached to the wireless device and when the wireless device is operational.

For example, as shown in FIG. 15, the third portion 156 includes a button that can be pressed to trigger an activation and/or action associated with the screen 154. For another example, the third portion 156 can include a keypad for the wireless device including buttons corresponding to digits 0-9, symbols "*" and "#", etc. Although not shown in FIG. 15, in other embodiments, the third portion 156 can include any other elements associated with the surface 150, and be in any shape specifically adapted for those element(s).

In some alternative embodiments, a protective cover made from two different materials can be configured to cover both the first portion and the second portion 158 of the surface 150 of the wireless device. When such a protective cover is attached to the surface 150, the first portion is covered by a first material such that the screen 154 and/or other elements in the first portion are visible to a user of the wireless device. The second portion 158 is covered by a second material different from the first material, such that the proximity sensor is not triggered and the camera can operate normally even though the apertures 151 and 153 are covered by the second material. In such embodiments, the second material can be any material that is, for example, transparent and/or thin enough to not trigger the proximity sensor and not block an access to the camera when the apertures 151 and 153 are covered by the second material.

In some other alternative embodiments, a protective cover made from the same material can have two or more than two portions with different thickness. When such a protective cover is attached to the surface 150 of the wireless device, the first portion of the surface 150 is covered by a first portion of the protective cover that is relatively thick, such that the screen 154 and/or other elements in the first portion of the surface 150 can be protected. The second portion 158 of the surface 150 is covered by a second portion of the protective cover that is relatively thin, such that the proximity sensor is not triggered and the camera can operate normally even though the apertures 151 and 153 are covered by the second portion of the protective cover. For example, the first portion of the protective cover can be, for example, 0.55 mm in thickness and the second portion of the protective cover can be, for example, 0.13 mm in thickness.

FIGS. 16 and 17 show a front view and side view, respectively, of a protective cover 160 for a wireless device A, according to an embodiment. FIG. 18 shows a perceptive view of the protective cover 160 when attached to the wireless device A. In some embodiments, the protective cover 160 can be removably attached to the wireless device A. That is, the protective cover 160 can be removed from the wireless device A. For example, the protective cover 160 can have a press-fit attachment or a snap-fit attachment to the wireless device A. In some embodiments, the protective cover 160 can be removably or permanently attached to a wireless device (e.g., the wireless device A) by using, for example, a glue material, a connecting device or any other suitable material or device.

The wireless device A can be any type of device configured to communicate with other devices wirelessly. Such a wireless device can be, for example, a smart phone (e.g., an Apple iPhone® 5s), a tablet computer device (e.g., an Apple iPad®), a mobile communication device (e.g., a cell phone), and/or the like. Although the protective covers shown and described with respect to FIGS. 16-33 are designs for an Apple iPhone®, in other embodiments, the protective covers described herein can be designed for other wireless devices (e.g., other smart phones, tablet computer devices). That is, the shape, size and/or material of the protective covers can be designed accordingly to complimentarily fit with or removably attach to the other wireless devices.

In some embodiments, the wireless device A can have one or more embedded antennas (not shown in FIG. 18) configured to function as a proximity sensor for the wireless device A instead of or in addition to transmitting signals from and receiving signals at the transceiver (not shown in FIG. 18) of the wireless device A. That is, at least a portion of the antenna(s) can perform proximity sensing for the wireless device A. The wireless device A has an exterior surface at the side of the wireless device A including a portion A' that is associated with the antenna(s) configured to perform proximity sensing. The exterior surface can be substantially planar. In some embodiments, the portion A' covers, houses or is disposed over at least a portion of the antenna(s) configured to perform proximity sensing for the wireless device A. Similar to the proximity sensor discussed above with respect to FIG. 12, when an object (e.g., a portion of a protective cover, a user's body part such as the user's hand or the user's head, etc.) is disposed over (or above), covers or contacts the portion A', the object can be detected by the antenna(s) as a result of proximity sensing performed by the antenna(s). Thus, the antenna(s) can cause the wireless device A (e.g., send a signal to other components of the wireless device A) to, for example, reduce the TRP of the wireless device A. In some embodiments, the closer the object is to the portion A', or the larger the portion A' is covered by the object, the more the TRP of the wireless device A is reduced. As explained above, however, the reduced TRP reduces the RF signal transmission power, and consequently degrades communication quality for the wireless device A.

As shown in FIGS. 16, 17 and 18, a side portion of the protective cover 160 has a cover section 161 and a cut-out section 168. The side portion of the protective cover 160 can be substantially planar. The cover section 161 has an outer boundary that substantially corresponds to an outer boundary of a portion of the exterior surface that is mutually exclusive from the portion A' of the wireless device A. The cut-out section 168 is in the location substantially corresponding to the portion A', and has a shape substantially corresponding to the shape of the portion A'. As a result, when the protective cover 160 is attached to the wireless device A, as shown in FIG. 18, the protective cover 160 does not cover, contact or operatively affect the portion A' of the wireless device A. Consequently, no constant reduction in transmission signal quality is caused whenever the protective cover 160 is used with the wireless device A.

Specifically, when the protective cover 160 is attached to the wireless device A, the cover section 161 covers the portion of the exterior surface of the wireless device A that is mutually exclusive from the portion A' of the wireless device A, while the cut-out section 168 causes the portion A' to be uncovered. When the wireless device A with the protective cover 160 attached is used by a user, the cover section 161 is disposed between the user's body (e.g., the user's hand, the user's head) and the portion of the exterior surface of the wireless device A mutually exclusive from the portion A', while the portion A' is exposed to the user's body through the cut-out section 168 (i.e., no part of the protective cover 160 covers the portion A', or is disposed between the user's body and the portion A'). In this way, use of the protective cover 160 does not affect proximity sensing performed by the antenna(s), and thereby does not affect the TRP produced by the wireless device A during mobile communication applications (such as telephone calls, data messaging, Internet applications, video conferencing, etc.). In addition or alternatively, the use of the protective cover 160 does not affect a portion(s) of the antenna that is sensitive to changes to local dielectric matching or local impedance matching. For example, one portion(s) of the antenna can be insensitive to changes to local dielectric matching or local impedance matching, while another portion(s) of the antenna can be sensitive to changes to local dielectric matching or local impedance matching. In this example, the cover section 161 of protective cover 160 can cover the portion(s) of the antenna that is insensitive to changes to local dielectric matching or local impedance matching, and the portion(s) of the antenna that is sensitive to changes to local dielectric matching or local impedance matching is exposed through the cut-out section 168 of the protective cover.

In some embodiments, the cover section 161 of the protective cover 160 can have a first surface 167 (i.e., an inner surface) and a second surface 169 (i.e., an outer surface). When the protective cover 160 is attached to the wireless device A, as shown in FIG. 18, the inner surface 167 is disposed between the outer surface 169 and the portion of the exterior surface of the wireless device A that is mutually exclusive from the portion A'. Similarly stated, the material of protective cover 160 covers the portion of the exterior surface mutually exclusive from the portion A' but not the portion A'. As a result, the proximity sensor (embodied by the antenna(s) portion(s) discussed above) is not affected by the material of the protective cover 160 when the protective cover 160 is attached to the wireless device A and when the wireless device A is operational. In addition or alternatively, the use of the protective cover 160 does not affect a portion(s) of the antenna that is sensitive to changes to local dielectric matching or local impedance matching Although shown and described with respect to FIGS. 16-33 as the portion of exterior surface associated with the antenna(s) (e.g., the portion A') being located at a side surface of a wireless device (e.g., the wireless device A), in other embodiments, depending on the location of the antenna(s) inside a wireless device, such a portion of exterior surface can be located at other surfaces (e.g., a front surface, a back surface) of a wireless device. In such embodiments, the cut-out section of the protective cover can be located at other surfaces (e.g., a front cover, a back cover) of the protective cover accordingly. For example, the cut-out section can be located at a front cover that covers a screen or touchscreen of a wireless device. For another example, the cut-out section can be located at a back cover that covers a battery component of a wireless device. For yet another example, similar to the designs discussed above, the cut-out section can be located at a front cover or a back cover and designed to allow direct access to a camera (i.e., not covering the camera) of a wireless device. In yet other embodiments, the protective cover can have multiple cut-out sections each of which relates to an antenna or antenna portion that performs proximity sensing.

In some instances, the portion A' of the exterior surface of the wireless device A is unrelated to any user interface component (not shown in FIG. 18) of the wireless device A. For example, the portion A' is not associated with or does not include a camera, a button, a switch, an indicator, an audio jack receptacle, and/or the like. Thus, a user can operate the wireless device A without touching the portion A' (e.g., manipulating a button or a switch) or using a direct access to the portion A' in other ways (e.g., using a camera included in the portion A', checking an indicator included in the portion A', connecting an earphone to an earphone hole included in the portion A').

In some instances, the cover section 161 and/or other portions of the protective cover 160 (not including the cut-out section 168) can be transparent such that the portion of the exterior surface of the wireless device A that is mutually exclusive from the portion A' can be visible to a user of the wireless device A when the protective cover 160 is attached to the wireless device A.

FIGS. 19-21 show a side view, back view and side view, respectively, of a protective cover 170 for a wireless device (not shown in FIGS. 19-21), according to another embodiment. The protective cover 170 can be structurally and functionally similar to the protective cover 160 shown and described with respect to FIGS. 16-18. Similar to the protective cover 160 in FIGS. 16-18, as shown in FIGS. 19-21, a side portion of the protective cover 170 has a cover section 171 and a cut-out section 175. The cover section 171 can be structurally and functionally similar to the cover section 161 of the protective cover 160 in FIGS. 16-18. The cut-out section 175 can be structurally and functionally similar to the cut-out section 168 of the protective cover 160 in FIGS. 16-18. Furthermore, as shown in FIGS. 19-21, the cut-out section 175 has a shape and a size different from the shape and size of the cut-out section 168. In some embodiments, the shape and/or size of a cut-out section (e.g., the cut-out section 168, the cut-out section 175) can be designed to substantially correspond to the shape and/or size of the portion of the antenna(s) configured to perform proximity sensing for a wireless device. As a result, such cut-out sections of protective covers can have various shapes and/or sizes for different types or models of wireless devices.

FIGS. 22-25 show an assembly view, a front view, a right side view and a side perspective view, respectively, of a protective cover 180 for a wireless device B, according to an embodiment. The protective cover 180 can be structurally and functionally similar to the protective covers 160, and 170 shown and described with respect to FIGS. 16-18 and 19-21, respectively.

As shown in FIGS. 22-25, a side portion of the protective cover 180 has a cover section 189, a first cut-out section 185, and a second cut-out section 188. The cover section 189, the cut-out section 185 and the cut-out section 188 are mutually exclusive from each other. The cover section 189 can be structurally and functionally similar to the cover section 161 of the protective cover 160 in FIGS. 16-18 or the cover section 171 of the protective cover 170 in FIGS. 19-21. The cut-out section 185 can be structurally and functionally similar to the cut-out section 168 of the protective cover 160 in FIGS. 16-18 or the cut-out section 175 of the protective cover 170 in FIGS. 19-21. As shown in FIGS. 22-25, the cut-out section 185 can have a shape and/or size different from the shape and/or size of the cut-out section 168 or the cut-out section 175.

In some embodiments, the cut-out section 188 can be functionally similar to the cut-out section 168 or the cut-out section 175. In such embodiments, the cut-out section 185 and the cut-out section 188 can be collectively associated with one or more portions of the antenna(s) of the wireless device B that are configured to perform proximity sensing for the wireless device B. As a result, when the protective cover 180 is attached to the wireless device B, the cut-out section 185 and the cut-out section 188 can collectively cause that portion(s) of the antenna(s) not to be covered, thus not affecting proximity sensing performed by that portion(s) of the antenna(s). Although shown in FIGS. 22-25 as the two cut-out sections 185, 188 being separated by a portion of the cover section 189, in some other embodiments, the two cut-out sections can be connected (e.g., forming a large, connected cut-out section). Furthermore, in some other alternative embodiments, a protective cover can have any number of cut-out sections with various shapes (e.g., rectangle, circular, triangle) and/or sizes at different locations (e.g., at a side surface, a front surface, a top surface, a back surface or a bottom surface), which collectively cause the proximity sensing of the antenna(s) of a wireless device not to be affected when the protective cover is attached to that wireless device.

In some other instances, the cut-out section 188 can be associated with a user interface component (not shown in FIG. 25) of the wireless device B such that a user can operate the wireless device B by manipulating that user interface component through the cut-out section 188 when the protective cover 180 is attached to the wireless device B. For example, the cut-out section 188 can be designed such that a switch, button, camera, earphone hole, indicator, etc., of the wireless device B is not covered by the protective cover 180 when the protective cover 180 is attached to the wireless device B. Thus, a user can operate the wireless device B by touching the component (e.g., manipulating a switch or a button) or using a direct access to the component (e.g., using a camera, connecting an earphone to an earphone hole, checking an indicator) through the cut-out section 188.

FIGS. 26-33 show a front view, a top view, a left side view, a bottom view, a right side view, a rear view, a front perspective view and a side perspective view, respectively, of a protective cover 190 for a wireless device (not shown in FIGS. 26-33), according to an embodiment. The protective cover 190 can be structurally and functionally similar to the protective covers 160, 170 and 180 shown and described with respect to FIGS. 16-25. Similar to the protective covers 160, 170 in FIGS. 16-18 and 19-21, as best shown in FIGS. 30, 32 and 33, a side portion of the protective cover 190 has a cover section 191 and a cut-out section 195. The cover section 191 can be structurally and functionally similar to the cover section 161 of the protective cover 160 or the cover section 171 of the protective cover 170. The cut-out section 195 can be structurally and functionally similar to the cut-out section 168 of the protective cover 160 or the cut-out section 175 of the protective cover 170. Furthermore, as best shown in FIGS. 30, 32 and 33, the cut-out section 195 can have a shape and/or size different from the shape and/or size of the cut-out section 168 or the cut-out section 175.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus comprising:
    a protective cover configured to attach to a handheld wireless computing device, the protective cover including:
        a first section configured to cover a first portion of the handheld wireless computing device; and
        a second section different from the first section configured to cover a second portion of the handheld wireless computing device, the second portion associated with an antenna of the handheld wireless computing device,
        wherein the second section is configured to not affect operation of the antenna associated with the second portion.

2. The apparatus of claim 1, wherein the second section is configured to not change a dielectric matching of an environment around the second portion of the handheld wireless computing device.

3. The apparatus of claim 1, wherein the first section is formed of a first material and the second section is formed of a second material different from the first material.

4. The apparatus of claim 3, wherein the first material has a first dielectric constant and the second material has a second dielectric constant different from the first dielectric constant.

5. The apparatus of claim 1, wherein the first section has a first thickness and the second section has a second thickness that is different from the first thickness.

6. The apparatus of claim 5, wherein the second thickness is less than the first thickness.

7. The apparatus of claim 1, wherein the first section of the protective cover is positioned to cover a screen of the handheld wireless computing device.

8. The apparatus of claim 1, wherein:
    the antenna of the handheld wireless computing device is a proximity sensor; and
    the second section of the protective cover is configured to not trigger the proximity sensor when the protective cover is attached to the handheld wireless computing device and when the handheld wireless computing device is operating.

9. The apparatus of claim 1, wherein the second section of the protective cover is positioned to cover a camera of the handheld wireless computing device, wherein the second section is configured to not block access to the camera when the protective cover is attached to the handheld wireless computing device.

10. The apparatus of claim 1, wherein the second section of the protective cover is transparent.

11. The apparatus of claim 1, wherein the second section of the protective cover is configured to cover portions of the antenna that are sensitive to changes to a local dielectric matching or a local impedance matching.

12. The apparatus of claim 1, wherein the protective cover is positioned between the handheld wireless computing device and a user when the protective cover is attached to the handheld wireless computing device and when the handheld wireless computing device is used by the user.

13. The apparatus of claim 1, wherein the second section is configured to not degrade a performance of the antenna.

14. The apparatus of claim 1, wherein the second section is configured to enhance a performance of the antenna.

15. An apparatus comprising:
    a protective cover configured to attach to a handheld wireless computing device, the protective cover including:
        a first section formed of a first material configured to cover a first portion of the handheld wireless computing device; and
        a second section formed of a second material different from the first material configured to cover a second portion of the handheld wireless computing device, the second portion associated with an antenna of the handheld wireless computing device,
        wherein the second section is configured to not affect operation of the antenna associated with the second portion.

16. The apparatus of claim 15, wherein the first material has a first dielectric constant and the second material has a second dielectric constant different from the first dielectric constant, wherein the second dielectric constant is configured to not adversely affect operation of the antenna.

17. The apparatus of claim 15, wherein:
    the antenna of the handheld wireless computing device is a proximity sensor; and
    the second material of the second section is configured to not trigger the proximity sensor when the protective cover is attached to the handheld wireless computing device and when the handheld wireless computing device is operating.

18. An apparatus comprising:
    a protective cover configured to attach to a handheld wireless computing device, the protective cover including:
        a first section having a first thickness and configured to cover a first portion of the handheld wireless computing device; and
        a second section having a second thickness different from the first thickness and configured to cover a second portion of the handheld wireless computing device, the second portion associated with an antenna of the handheld wireless computing device,
        wherein the second section is configured to not affect operation of the antenna associated with the second portion.

19. The apparatus of claim 18, wherein the second thickness is less than the first thickness.

20. The apparatus of claim 18, wherein:
    the antenna of the handheld wireless computing device is a proximity sensor; and
    the second thickness of the second section is configured to not trigger the proximity sensor when the protective cover is attached to the handheld wireless computing device and when the handheld wireless computing device is operating.

* * * * *